(12) United States Patent
Ho et al.

(10) Patent No.: US 11,855,275 B2
(45) Date of Patent: Dec. 26, 2023

(54) METHOD OF PREPARING CATHODE FOR SECONDARY BATTERY

(71) Applicant: GRST International Limited, Hong Kong (CN)

(72) Inventors: Kam Piu Ho, Hong Kong (CN); Yingkai Jiang, Shenzhen (CN)

(73) Assignee: GRST International Limited, Hong Kong (CN)

( * ) Notice: Subject to any disclaimer, the term of this patent is extended or adjusted under 35 U.S.C. 154(b) by 41 days.

(21) Appl. No.: 17/794,273

(22) PCT Filed: May 22, 2020

(86) PCT No.: PCT/CN2020/091936
§ 371 (c)(1),
(2) Date: Jul. 21, 2022

(87) PCT Pub. No.: WO2021/184534
PCT Pub. Date: Sep. 23, 2021

(65) Prior Publication Data
US 2023/0061306 A1    Mar. 2, 2023

(30) Foreign Application Priority Data
Mar. 20, 2020    (WO) ............... PCT/CN2020/080525

(51) Int. Cl.
*H01M 4/04*      (2006.01)
*H01M 4/1391*    (2010.01)
(Continued)

(52) U.S. Cl.
CPC ....... *H01M 4/1391* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

2016/0064729 A1*    3/2016    Shindo ................ C01G 53/52
                                                    429/231.95
2017/0352864 A1*   12/2017    Kawakami ............. H01M 4/13

FOREIGN PATENT DOCUMENTS

CN    101578724 A    11/2009
CN    105164832 A    12/2015
(Continued)

OTHER PUBLICATIONS

Partial machine translation of JP 06-111816 from IDS filed Jul. 21, 2022 (Foreign Patent Document 1).*

(Continued)

*Primary Examiner* — Austin Murata

(57) ABSTRACT

A method for preparing a cathode based on an aqueous slurry is provided. The cathode slurry with improved stability in water comprises a cathode active material, especially a nickel-containing cathode active material. Treatment of nickel-containing cathode active materials with lithium compounds may improve stability of the cathode by preventing undesirable decomposition of the material. In addition, battery cells comprising the cathode prepared by the method disclosed herein exhibit impressive electrochemical performances.

12 Claims, 6 Drawing Sheets

(51) Int. Cl.
- *H01M 4/131* (2010.01)
- *H01M 4/36* (2006.01)
- *H01M 4/505* (2010.01)
- *H01M 4/525* (2010.01)
- *H01M 4/62* (2006.01)
- *H01M 4/02* (2006.01)

(52) U.S. Cl.
CPC ........... *H01M 4/366* (2013.01); *H01M 4/505* (2013.01); *H01M 4/525* (2013.01); *H01M 4/625* (2013.01); *H01M 4/628* (2013.01); *H01M 2004/028* (2013.01)

(56) References Cited

FOREIGN PATENT DOCUMENTS

| | | |
|---|---|---|
| CN | 105390671 A | 3/2016 |
| CN | 107342392 A | 11/2017 |
| CN | 108028141 A | 5/2018 |
| CN | 108123096 A | 6/2018 |
| CN | 108475825 A | 8/2018 |
| EP | 3044822 A | 7/2016 |
| JP | 06111816 A | 4/1994 |
| JP | 2005-228679 A | 8/2005 |
| WO | 2020017515 A1 | 1/2020 |

OTHER PUBLICATIONS

International Search Report of PCT Patent Application No. PCT/CN2020/091936 dated Dec. 21, 2020.
Written Opinion of the International Searching Authority of PCT Patent Application No. PCT/CN2020/091936 dated Dec. 21, 2020.

\* cited by examiner

METHOD OF PREPARING CATHODE FOR SECONDARY BATTERY

CROSS-REFERENCE TO RELATED APPLICATIONS

This is a U.S. national stage application of the International Patent Application No. PCT/CN2020/091936, filed May 22, 2020, which claims the benefit under 35 U.S.C. § 365(c) of International Patent Application No. PCT/CN2020/080525, filed Mar. 20, 2020, the content of which is incorporated herein by reference in its entirety.

FIELD OF THE INVENTION

The present invention relates to the field of batteries. In particular, this invention relates to methods for preparing cathode for lithium-ion batteries.

BACKGROUND OF THE INVENTION

Over the past decades, lithium-ion batteries (LIBs) have come to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

The use of multi-element lithium transition metal oxide such as lithium nickel manganese cobalt oxide (NMC) and lithium nickel cobalt aluminum oxide (NCA) has become popular due to their superior electrochemical properties over traditional cathode active materials such as $LiMnO_2$, $LiCoO_2$, and $LiNiO_2$. Such superior electrochemical properties include a high energy density and superior capacity performance.

Currently, cathodes are often prepared by dispersing a cathode active material, a binder material and a conductive agent in an organic solvent such as N-methyl-2-pyrrolidone (NMP) to form a cathode slurry, then coating the cathode slurry onto a current collector and drying it.

The use of aqueous solutions instead of organic solvents is preferred for environmental reasons and easier handling and therefore water-based slurries have been considered. However, nickel-containing cathode active materials can react with water during electrode preparation, which causes metals in the cathode active material to leach out of the cathode active material and leads to performance degradation. Lithium dissolution at the surface of the cathode active material results in the formation of soluble bases. The high soluble base content raises the pH of the cathode slurry, which may affect the dispersion homogeneity of the components (e.g., cathode active material) in the cathode slurry and the binding strength of the binder material. It can also have negative effects on the metallic components of the electrode (e.g., the current collector) and adversely affect the performance of the cathode active material. For example, the cathode active material will react with aluminum current collectors to produce $Al(OH)_3$ precipitate, which will hinder the transfer of lithium ions, thereby reducing the battery capacity retention rate. These factors all contribute to poor electrochemical performance. Conventionally, a pH modifier is used to adjust the pH of the cathode slurry. However, such additives may also have a deleterious effect on the electrochemical processes that take place at the cathode, especially at higher voltages and temperatures, which in turn diminishes battery performance. Accordingly, it is desirable to prevent lithium dissolution from the surface of the cathode active material in the process of the cathode slurry preparation.

EP Patent Application Publication No. 3044822 A discloses a water-based lithium transition metal oxide cathode slurry. The slurry comprises a lithium transition metal oxide powder, which consists of primary particles comprising a polymer-containing coating layer. The coating layer is composed of two layers. The outer layer contains a fluorine-containing polymer that prevents the pH-raising ion exchange reaction with water by reducing surface coverage of water. The inner layer contains a product, such as LiF, of the reaction between the polymer of the outer layer and the lithium transition metal oxide, where the reaction decomposes the surface base and reduces the base potential of the oxide. However, the fluorine-containing polymers increase electrical resistance, which leads to reduced battery performance, as well as pose risks to the health of people and the environment.

In view of the above, there is always a need to develop a method for preparing cathode slurries having a nickel-containing cathode active material for lithium-ion batteries with good electrochemical performance using a simple, fast and environmentally-friendly method.

SUMMARY OF THE INVENTION

The aforementioned needs are met by various aspects and embodiments disclosed herein. In one aspect, provided herein is a method for preparing a cathode for a secondary battery, comprising the steps of:
1) dispersing a binder material and a conductive agent in water to form a first suspension;
2) adding an aqueous solution containing at least one lithium compound into the first suspension to form a second suspension;
3) adding a cathode active material into the second suspension to form a third suspension;
4) homogenizing the third suspension by a homogenizer to obtain a homogenized slurry;
5) applying the homogenized slurry on a current collector to form a coated film on the current collector; and
6) drying the coated film on the current collector to form the cathode,
wherein the lithium compound is selected from the group consisting of lithium borate, lithium bromide, lithium chloride, lithium hydrogen carbonate, lithium hydroxide, lithium iodide, lithium nitrate, lithium sulfate, lithium acetate, lithium lactate, lithium citrate, lithium succinate and combinations thereof.

In some embodiments, the cathode active material is selected from the group consisting of $Li_{1+x}Ni_aMn_bCo_cAl_{(1-a-b-c)}O_2$, $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiCoO_2$, $LiNiO_2$, $LiMnO_2$, $LiMn_2O_4$, $Li_2MnO_3$, and combinations thereof; wherein $-0.2 \leq x \leq 0.2$, $0 \leq a < 1$, $0 \leq b < 1$, $0 \leq c < 1$, and $a+b+c \leq 1$. In further embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$.

In certain embodiments, the solubility of the lithium compound in water with 20° C. is higher than 1 g/100 ml. In some embodiments, the concentration of lithium ions in the second suspension ranges from about 0.0005 M to about 0.5 M.

In some embodiments, the conductive agent is selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon and combinations thereof.

In certain embodiments, step 2) is mixed for a time period from about 5 minutes to about 60 minutes at a temperature from about 5° C. to about 30° C. In some embodiments, the pH of the second suspension is from about 7 to about 13.

In some embodiments, the third suspension is homogenized for a time period from about 30 minutes to about 6 hours at a temperature from about 10° C. to about 30° C. In certain embodiments, the method provided herein further comprises a step of degassing the third suspension under a vacuum pressure of from about 1 kPa to about 20 kPa for a time period from about 30 minutes to about 4 hours.

In certain embodiments, the decrease in pH observed during step 4) is from about 0.1 pH units to about 1.0 pH units. In some embodiments, the solid content of the homogenized slurry is from about 45% to about 75% by weight, based on the total weight of the homogenized slurry. In further embodiments, the pH of the homogenized slurry is from about 8 to about 14.

In some embodiments, the homogenized slurry is free of a dispersing agent selected from the group consisting of a cationic surfactant, an anionic surfactant, a nonionic surfactant, an amphoteric surfactant, and a polymeric acid.

In certain embodiments, the coated film on the current collector is dried at a temperature from about 25° C. to about 75° C. for a time period of about 2 minutes to about 20 minutes In some embodiments, the total processing time for steps 3)-6) is less than 5 hours.

DETAILED DESCRIPTION OF THE INVENTION

Figure 1:
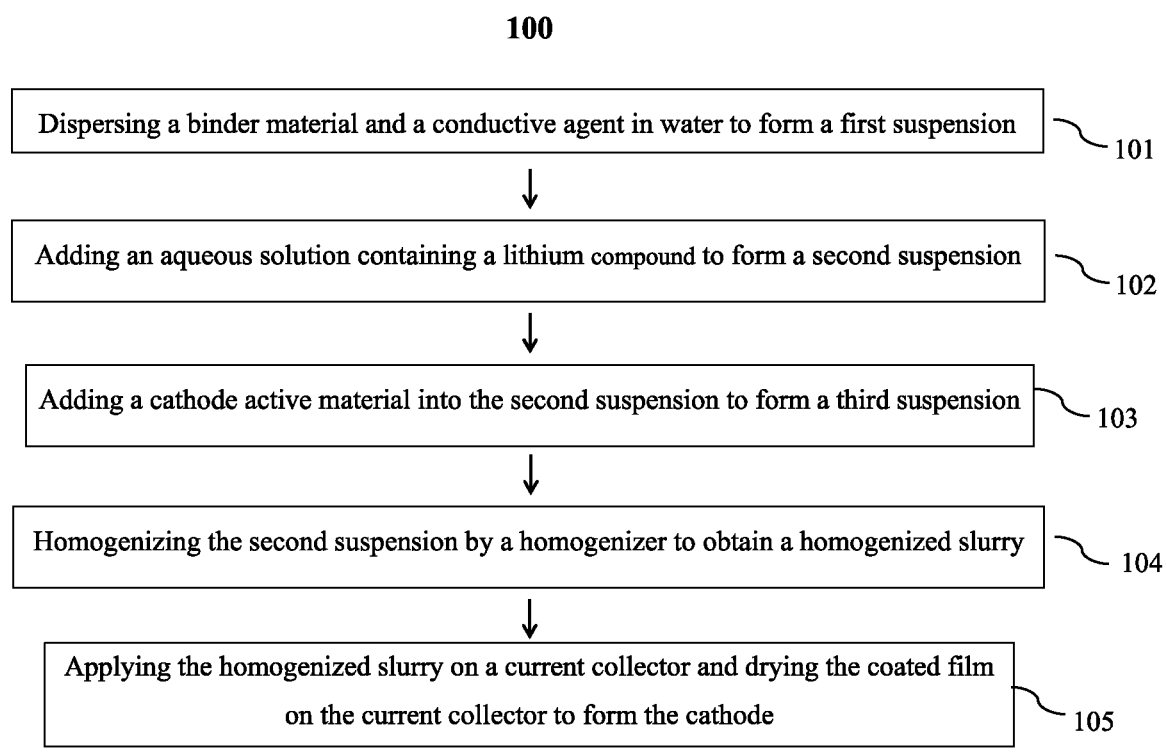
FIG. 1 is a flow chart of an embodiment illustrating the steps for preparing a cathode.

Provided herein is a method of preparing a cathode for a secondary battery, comprising the steps of:
1) dispersing a binder material and a conductive agent in water to form a first suspension;
2) adding an aqueous solution containing at least one lithium compound into the first suspension to form a second suspension;
3) adding a cathode active material into the second suspension to form a third suspension;
4) homogenizing the third suspension by a homogenizer to obtain a homogenized slurry;
5) applying the homogenized slurry on a current collector to form a coated film on the current collector; and
6) drying the coated film on the current collector to form the cathode,
wherein the lithium compound is selected from the group consisting of lithium borate, lithium bromide, lithium chloride, lithium hydrogen carbonate, lithium hydroxide, lithium iodide, lithium nitrate, lithium sulfate, lithium acetate, lithium lactate, lithium citrate, lithium succinate and combinations thereof.

The term "electrode" refers to a "cathode" or an "anode."

The term "positive electrode" is used interchangeably with cathode. Likewise, the term "negative electrode" is used interchangeably with anode.

The term "binder material" refers to a chemical or a substance used to hold an electrode material and/or a conductive agent in place and adhere them onto a conductive metal part to form an electrode. In some embodiments, the electrode does not comprise any conductive agent.

The term "conductive agent" refers to a material which is chemically inactive and has good electrical conductivity. Therefore, the conductive agent is often mixed with an electrode active material at the time of forming an electrode to improve electrical conductivity of the electrode.

"Polymer" refers to a polymeric compound prepared by polymerizing monomers, whether of the same or a different type. The generic term "polymer" embraces the terms "homopolymer," "copolymer," "terpolymer" as well as "interpolymer."

"Interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

The term "homogenizer" refers to an equipment that can be used for the homogenization of materials. The term "homogenization" refers to a process of distributing the materials uniformly throughout a fluid. Any conventional homogenizers can be used for the method disclosed herein. Some non-limiting examples of the homogenizer include stirring mixers, planetary stirring mixers, blenders and ultrasonicators.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "ultrasonicator" refers to an equipment that can apply ultrasound energy to agitate particles in a sample. Any ultrasonicator that can disperse the slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on the surface of the current collector. In other embodiments, the three-dimensional porous current collector is coated conformally with an electrode layer.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "slot-die coating" refers to a process for fabrication of large area films on rigid or flexible substrates. A slurry is applied to the substrate by continuously pumping slurry through a nozzle onto the substrate, which is mounted on a roller and constantly fed toward the nozzle. The thickness of the coating is controlled by various methods, such as altering the slurry flow rate or the speed of the roller.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "particle size D50" refers to a volume-based accumulative 50% size (D50), which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which can be formed by mutual agglomeration of primary particles, and in a case where the particles are composed of the primary particles only, it means a volume-averaged particle size of the primary particles.

The term "solid content" refers to the amount of non-volatile material remaining after evaporation.

The term "peeling strength" refers to the amount of force required to separate two materials that are bonded to each other, such as a current collector and an electrode active material coating. It is a measure of the adhesion strength between such two materials and is usually expressed in N/cm.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "miniampere-hour (mAh)" also refers to a unit of the storage capacity of a battery and is $\frac{1}{1,000}$ of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

Generally, lithium-ion battery electrodes are manufactured by casting an organic-based slurry onto a metallic current collector. The slurry contains electrode active material, conductive carbon, and binder in an organic solvent, most commonly N-methyl-2-pyrrolidone (NMP). The binder, most commonly polyvinylidene fluoride (PVDF), is dissolved in the solvent, and conductive additives as well as the electrode active material are suspended in the slurry. PVDF provides a good electrochemical stability and high adhesion to the electrode materials and current collectors. However, PVDF can only dissolve in some specific organic solvents such as N-methyl-2-pyrrolidone (NMP) which is flammable and toxic and hence requires specific handling.

An NMP recovery system must be in place during the drying process to recover NMP vapors. This will generate significant costs in the manufacturing process since it requires a large capital investment. The use of less expensive and more environmentally-friendly solvents, such as aqueous solvents, is preferred since it can reduce the large capital cost of the recovery system. The attempts to replace the organic NMP-based coating process with a water-based coating process have been successful for the negative electrode. A typical water-based slurry for anode coating comprises carboxymethyl cellulose (CMC) and styrene-butadiene rubber (SBR). Within the battery, cathodes are at high voltage. Most rubbers including SBR are only stable at the low voltage of the anode and will decompose at high voltage. Therefore, contrary to anodes, water-based coating for cathodes is much more difficult.

Another concern of water-based processing is the fact that many cathode active materials are not inert in water, which causes problems and complicates the implementation of water-based coating process for cathodes. The lithium in cathode active materials may react with $H_2O$ to generate LiGH, resulting in a degraded electrochemical performance. In general, the surface of the cathode active material is coated with an ion-conductive solid compound in order to enhance its stability toward and compatibility with water-based processing. Acid may also be added to the solution to adjust the slurry pH by neutralizing the base on the surface of the cathode active material. However, upon exposure to water, a significant amount of soluble base LiOH will continuously form, damaging the cathode active material at a significant rate.

Accordingly, the present invention provides a method of preparing a cathode via the use of a water-based slurry. FIG. 1 is a flow chart of an embodiment illustrating the steps of method 100 for preparing a cathode. The slurry prepared by the method disclosed herein shows improved stability by minimizing the reactivity of the cathode active material with water, thereby enhancing battery performance.

In general, Ni-rich NMC materials can react with water during electrode preparation, resulting in metal leaching that can cause structural changes and performance degradation. When NMC material is mixed with water, delithiated surface regions are rapidly formed within minutes, and the formation of surface impurities such as LiOH in the delithiated surface regions causes significant decrease in capacity. Yet, adding extra amounts of LiOH or other lithium compounds to the concentrations described herein will instead have the unexpected effect of improving the capacity and electrochemical performance of cathodes formed therefrom.

In some embodiments, the first suspension is formed by dispersing a binder material in water in step 101. In other embodiments, the first suspension further comprises a conductive agent dispersed in water.

In certain embodiments, the binder material is styrene-butadiene rubber (SBR), carboxymethyl cellulose (CMC), acrylonitrile copolymer, polyacrylic acid (PAA), polyacrylonitrile (PAN), polyacrylamide (PAM), LA132, LA133, LA138, latex, a salt of alginic acid, polyvinylidene fluoride (PVDF), poly(vinylidene fluoride)-hexafluoropropene (PVDF-HFP), polytetrafluoroethylene (PTFE), polystyrene, poly(vinyl alcohol) (PVA), poly(vinyl acetate), polyisoprene, polyaniline, polyethylene, polyimide, polyurethane, polyvinyl butyral, polyvinyl pyrrolidone (PVP), gelatin, chitosan, starch, agar-agar, xanthan gum, gum arabic, gellan gum, guar gum, gum karaya, tara gum, gum tragacanth, casein, amylose, pectin, PEDOT:PSS, carrageenans, and combinations thereof. In certain embodiments, the salt of alginic acid comprises a cation selected from Na, Li, K, Ca, $NH_4$, Mg, Al, or a combination thereof. In certain embodiments, the binder material is free of styrene-butadiene rubber, carboxymethyl cellulose, acrylonitrile copolymer, polyacrylic acid, polyacrylonitrile, LA132, LA133, LA138, TRD202A, latex, a salt of alginic acid, polyvinylidene fluoride, poly(vinylidene fluoride)-hexafluoropropene, polytetrafluoroethylene, polystyrene, poly(vinyl alcohol), poly (vinyl acetate), polyisoprene, polyaniline, polyethylene, polyimide, polyurethane, polyvinyl butyral, polyvinyl pyrrolidone, gelatin, chitosan, starch, agar-agar, xanthan gum, gum arabic, gellan gum, guar gum, gum karaya, tara gum, gum tragacanth, casein, amylose, pectin or carrageenans. In certain embodiments, the binder material is not a fluorine-containing polymer such as PVDF, PVDF-HFP or PTFE.

In some embodiments, the binder material is a polymer comprising one or more functional groups containing a halogen, O, N, S or a combination thereof. Some non-limiting examples of suitable functional groups include alkoxy, aryloxy, nitro, thiol, thioether, imine, cyano, amide, amino (primary, secondary or tertiary), carboxyl, ketone, aldehyde, ester, hydroxyl and a combination thereof. In some embodiments, the functional group is or comprises alkoxy, aryloxy, carboxy (i.e., —COOH), nitrile, —$CO_2CH_3$, —$CONH_2$, —$OCH_2CONH_2$, or —$NH_2$.

In certain embodiments, the binder material is a polymer comprising one or more monomers selected from the group consisting of optionally substituted vinyl ether, vinyl acetate, acrylonitrile, acrylamide, methacrylamide, acrylic acid, methacrylic acid, acrylic ester, methacrylic ester, 2-hydroxyethyl acrylate and combinations thereof.

In some embodiments, the binder material disclosed herein is derived from at least one olefin monomer and at least one monomer comprising a functional group selected from the group consisting of amino, cyano, carboxyl and combinations thereof. An olefin refers to an unsaturated hydrocarbon-based compound with at least one carbon-carbon double bond. In certain embodiments, the olefin is a conjugated diene. Some non-limiting examples of suitable olefins include $C_{2-20}$ aliphatic and $C_{8-20}$ aromatic compounds containing vinylic unsaturation, as well as cyclic compounds, such as cyclobutene, cyclopentene, dicyclopentadiene, and norbornene. Some non-limiting examples of suitable olefin monomers include styrene, ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_{4-40}$ dienes and combinations thereof. In certain embodiments, the olefin monomer is propylene, 1-butene, 1-pentene, 1-hexene, 1-octene or a combination thereof. In some embodiments, the $C_{4-40}$ dienes include, but not limited to, 1,3-butadiene, 1,3-pentadiene, 1,4-hexadiene, 1,5-hexadiene, 1,7-octadiene, 1,9-decadiene, isoprene, myrcene and combinations thereof.

In certain embodiments, the binder material disclosed herein is derived from at least two vinyl monomers selected from styrene, substituted styrene, vinyl halides, vinyl ether, vinyl acetate, vinyl pyridine, vinylidene fluoride, acrylonitrile, acrylic acid, acrylic esters, methacrylic acid, methacrylic esters, acrylamide, methacrylamide and combinations thereof. In certain embodiments, the binder material disclosed herein are derived from acrylonitrile or methacrylonitrile, and acrylic acid or methacrylic acid. In certain embodiments, the binder material disclosed herein are derived from acrylonitrile or methacrylonitrile, and acrylamide or methacrylamide. In certain embodiments, the binder material disclosed herein are derived from acrylonitrile or methacrylonitrile, acrylic acid or methacrylic acid, and acrylamide or methacrylamide. In some embodiments, the binder material disclosed herein are derived from acrylonitrile or methacrylonitrile, acrylic acid or methacrylic acid, methyl acrylate or methyl methacrylate, and acrylamide or methacrylamide.

In some embodiments, the binder material disclosed herein is a random interpolymer. In other embodiments, the binder material disclosed herein is a random interpolymer wherein the at least two monomer units are randomly distributed. In some embodiments, the binder material disclosed herein is an alternating interpolymer. In other embodiments, the binder material disclosed herein is an alternating interpolymer wherein the at least two monomer units are alternatively distributed. In certain embodiments, the binder material is a block interpolymer.

In certain embodiments, the conductive agent is a carbonaceous material selected from the group consisting of carbon, carbon black, graphite, expanded graphite, graphene, graphene nanoplatelets, carbon fibers, carbon nanofibers, graphitized carbon flake, carbon tubes, carbon nanotubes, activated carbon, mesoporous carbon, and combinations thereof. In certain embodiments, the conductive agent does not comprise a carbonaceous material.

In some embodiments, the conductive agent is a conductive polymer selected from the group consisting of polypyrrole, polyaniline, polyacetylene, polyphenylene sulfide (PPS), polyphenylene vinylene (PPV), poly(3,4-ethylenedioxythiophene) (PEDOT), polythiophene and combinations thereof. In some embodiments, the conductive agent plays two roles simultaneously not only as a conductive agent but also as a binder. In certain embodiments, the positive electrode layer comprises two components, the cathode active material and conductive polymer. In other embodiments, the positive electrode layer comprises the cathode active material, conductive agent and conductive polymer. In certain embodiments, the conductive polymer is an additive and the positive electrode layer comprises the cathode active material, conductive agent, binder and conductive polymer. In other embodiments, the positive electrode layer does not comprise a conductive polymer.

In certain embodiments, the amount of each of the binder material and the conductive material in the first suspension is independently from about 1% to about 50%, from about 1% to about 40%, from about 1% to about 30%, from about 1% to about 20%, from about 1% to about 15%, from about 1% to about 10%, from about 1% to about 5%, from about 3% to about 20%, from about 5% to about 20%, from about 5% to about 10%, from about 10% to about 20%, from about 10% to about 15%, or from about 15% to about 20% by weight, based on the total weight of the first suspension. In some embodiments, the amount of each of the binder material and the conductive material in the first suspension is independently less than 20%, less than 15%, less than 10%, less than 8%, or less than 6% by weight, based on the total weight of the first suspension.

In some embodiments, the solid content of the first suspension is from about 10% to about 40%, from about 10% to about 35%, from about 10% to about 30%, from about 10% to about 25%, from about 10% to about 20%, from about 10% to about 18%, from about 12% to about 25%, from about 12% to about 20%, from about 12% to about 18%, from about 15% to about 25%, from about 15% to about 20%, or from about 18% to about 25% by weight, based on the total weight of the first suspension. In certain embodiments, the solid content of the first suspension is about 10%, about 12%, about 15%, about 18%, about 20%, or about 25% by weight, based on the total weight of the first suspension. In certain embodiments, the solid content of the first suspension is at least 10%, at least 12%, at least 15%, at least 18%, or at least 20% by weight, based on the total weight of the first suspension. In certain embodiments, the solid content of the first suspension is less than 25%, less than 20%, less than 18%, or less than 15% by weight, based on the total weight of the first suspension.

In certain embodiments, the first suspension is mixed at a temperature from about 10° C. to about 40° C., from about 10° C. to about 35° C., from about 10° C. to about 30° C., from about 10° C. to about 25° C., from about 10° C. to about 20° C., or from about 10° C. to about 15° C. In some embodiments, the first suspension is mixed at a temperature of less than 40° C., less than 35° C., less than 30° C., less than 25° C., less than 20° C., less than 15° C., or less than 10° C. In some embodiments, the first suspension is mixed at a temperature of about 40° C., about 35° C., about 30° C., about 25° C., about 20° C., about 15° C., or about 10° C.

In some embodiments, an aqueous solution containing a lithium compound is prepared by dissolving the lithium compound in water. The second suspension is formed by adding the aqueous solution containing a lithium compound into the first suspension in step 102.

In certain embodiments, the lithium compound is selected from the group consisting of lithium borate, lithium bromide, lithium chloride, lithium hydrogen carbonate, lithium hydroxide, lithium iodide, lithium nitrate, lithium sulfate, lithium acetate, lithium lactate, lithium citrate, lithium succinate and combinations thereof.

The second suspension is formed by adding the aqueous solution containing a lithium compound into the first suspension. It is found that the second suspension should be stirred for a time period of less than about 1 hour since a stirring time above 60 minutes may be detrimental to the binder or conductive agent. In some embodiments, the second suspension is stirred for a time period from about 1 minute to about 60 minutes, from about 1 minute to about 50 minutes, from about 1 minute to about 40 minutes, from about 1 minute to about 30 minutes, from about 1 minute to about 20 minutes, from about 1 minute to about 10 minutes, from about 5 minutes to about 60 minutes, from about 5 minutes to about 50 minutes, from about 5 minutes to about 40 minutes, from about 5 minutes to about 30 minutes, from about 5 minutes to about 20 minutes, from about 5 minutes to about 10 minutes, from about 10 minutes to about 60 minutes, from about 10 minutes to about 50 minutes, from about 10 minutes to about 40 minutes, from about 10 minutes to about 30 minutes, from about 10 minutes to about 20 minutes, from about 15 minutes to about 60 minutes, from about 15 minutes to about 50 minutes, from about 15 minutes to about 40 minutes, from about 15 minutes to about 30 minutes, from about 15 minutes to about 20 minutes, from about 20 minutes to about 50 minutes, from about 20 minutes to about 40 minutes, or from about 20 minutes to about 30 minutes.

In certain embodiments, the second suspension is stirred for a time period of less than 60 minutes, less than 55 minutes, less than 50 minutes, less than 45 minutes, less than 40 minutes, less than 35 minutes, less than 30 minutes, less than 25 minutes, less than 20 minutes, less than 15 minutes, less than 10 minutes, or less than 5 minutes. In some embodiments, the second suspension is stirred for a time period of more than about 55 minutes, more than about 50 minutes, more than about 45 minutes, more than about 40 minutes, more than about 35 minutes, more than about 30 minutes, more than about 25 minutes, more than about 20 minutes, more than about 15 minutes, more than about 10 minutes, or more than about 5 minutes.

In some embodiments, the second suspension is stirred at a temperature range from about 5° C. to about 35° C., from about 5° C. to about 30° C., from about 5° C. to about 25° C., from about 5° C. to about 20° C., from about 5° C. to about 15° C., or from about 5° C. to about 10° C. In certain embodiments, the second suspension is stirred at a temperature of less than 35° C., less than 30° C., less than 25° C., less than 20° C., less than 15° C., or less than 10° C. In some embodiments, the second suspension is stirred at a temperature of higher than about 25° C., higher than about 20° C., higher than about 15° C., higher than about 10° C., or higher than about 5° C.

The concentration of lithium ions ($Li^+$) in the second suspension critically impacts the battery performance. In some embodiments, the concentration of $Li^+$ in the second suspension is from about 0.0005 M to about 0.5 M or from about 0.001 M to about 0.5 M. In certain embodiments, the concentration of $Li^+$ in the second suspension is from about 0.001 M to about 0.4 M, from about 0.001 M to about 0.3 M, from about 0.001 M to about 0.25 M, from about 0.001 M to about 0.2 M, from about 0.001 M to about 0.15 M, from about 0.001 M to about 0.1 M, from about 0.001 M to about 0.05 M, from about 0.001 M to about 0.01 M, from about 0.005 M to about 0.5 M, from about 0.005 M to about 0.4 M, from about 0.005 M to about 0.35 M, from about 0.005 M to about 0.3 M, from about 0.005 M to about 0.25 M, from about 0.005 M to about 0.2 M, from about 0.005 M to about 0.15 M, from about 0.005 M to about 0.1 M, or from about 0.005 M to about 0.05 M. In some embodiments, the concentration of $Li^+$ in the second suspension is less than about 0.5 M, less than about 0.4 M, less than about 0.35 M, less than about 0.3 M, less than about 0.25 M, less than about 0.2 M, less than about 0.15 M, or less than about 0.1 M. In some embodiments, the concentration of $Li^+$ in the second suspension is higher than about 0.001 M, higher than about 0.005 M, higher than about 0.01 M, higher than about 0.05 M, higher than about 0.1 M, higher than about 0.15 M, or higher than about 0.2 M.

In the traditional process for preparing cathode slurry, organic compounds, such as NMP, are often used as the solvent. However, using organic solvents causes severe environmental issues. One of the advantages of the present invention is that it prepares a cathode slurry by an aqueous processing method in which water is used as the solvent. A lithium compound is added into the slurry to stabilize the cathode active material in the aqueous slurry. Therefore, it is necessary for the lithium compound to be soluble in water. In some embodiments, the solubility of the lithium compound in water at 20° C. ranges from about 1 g/100 ml to about 200 g/100 ml, from about 1 g/100 ml to about 180 g/100 ml, from about 1 g/100 ml to about 160 g/100 ml, from about 1 g/100 ml to about 140 g/100 ml, from about 1 g/100 ml to about 120 g/100 ml, from about 1 g/100 ml to about 100 g/100 ml, from about 1 g/100 ml to about 90 g/100 ml, from about 1 g/100 ml to about 80 g/100 ml, from about 1 g/100 ml to about 70 g/100 ml, from about 1 g/100 ml to about 60 g/100 ml, from about 1 g/100 ml to about 50 g/100 ml, from about 1 g/100 ml to about 40 g/100 ml, from about 1 g/100 ml to about 30 g/100 ml, from about 1 g/100 ml to about 20 g/100 ml, from about 1 g/100 ml to about 10 g/100 ml, from about 20 g/100 ml to about 100 g/100 ml, from about 20 g/100 ml to about 80 g/100 ml, from about 20 g/100 ml to about 60 g/100 ml, from about 20 g/100 ml to about 40 g/100 ml, from about 20 g/100 ml to about 30 g/100 ml, from about 40 g/100 ml to about 100 g/100 ml, from about 40 g/100 ml to about 80 g/100 ml, from about 40 g/100 ml to about 60 g/100 ml, from about 60 g/100 ml to about 100 g/100 ml, from about 60 g/100 ml to about 80 g/100 ml, from about 100 g/100 ml to about 200 g/100 ml, from about 100 g/100 ml to about 180 g/100 ml, or from about 120 g/100 ml to about 180 g/100 ml. In some embodiments, the solubility of the lithium compound in water at 20° C. is less than 200 g/100 ml, less than 180 g/100 ml, less than 160 g/100 ml, less than 140 g/100 ml, less than 120 g/100 ml, less than 100 g/100 ml, less than 80 g/100 ml, less than 60 g/100 ml, less than 40 g/100 ml, or less than 20 g/100 ml. In some embodiments, the solubility of the lithium compound in water at 20° C. should be higher than about 1 g/100 ml, higher than about 10 g/100 ml, higher than about 20 g/100 ml, higher than about 30 g/100 ml, higher than about 40 g/100 ml, higher than about 50 g/100 ml, higher than about 60 g/100 ml, higher than about 70 g/100 ml, higher than about 80 g/100 ml, higher than about 90 g/100 ml, higher than about 100 g/100 ml, higher than about 120 g/100 ml, or higher than about 140 g/100 ml.

In some embodiments, the third suspension is formed by dispersing a cathode active material in the second suspension that comprises a binder, a conductive agent and at least one lithium compound at step 103.

In some embodiments, the active battery electrode material is a cathode active material, wherein the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.2 to 0.9; each y is independently from 0.1 to 0.45; and each z is independently from 0 to 0.2. In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, or $LiNi_xCo_yAl_zO_2$, wherein each x is independently from 0.2 to 0.9; each y is independently from 0.1 to 0.45; and each z is independently from 0 to 0.2. In certain embodiments, the cathode active material is $Li_{1+x}Ni_aMn_bCo_cAl_{(1-a-b-c)}O_2$; wherein $-0.2 \leq x \leq 0.2$, $0 \leq a < 1$, $0 \leq b < 1$, $0 \leq c < 1$, and $a+b+c \leq 1$. In some embodiments, the cathode active material has the general formula $Li_{1+x}Ni_aMn_bCo_cAl_{(1-a-b-c)}O_2$, with $0.33 \leq a \leq 0.92$, $0.33 \leq a \leq 0.9$, $0.33 \leq a \leq 0.8$, $0.5 \leq a \leq 0.92$, $0.5 \leq a \leq 0.9$, $0.5 \leq a \leq 0.8$, $0.6 \leq a \leq 0.92$, or $0.6 \leq a \leq 0.9$; $0 \leq b \leq 0.5$, $0 \leq b \leq 0.3$, $0.1 \leq b \leq 0.5$, $0.1 \leq b \leq 0.4$, $0.1 \leq b \leq 0.3$, $0.14 \leq b \leq 0.2$, or $0.2 \leq b \leq 0.5$; $0 \leq c \leq 0.5$, $0 \leq c \leq 0.3$, $0.1 \leq c \leq 0.5$, $0.1 \leq c \leq 0.4$, $0.1 \leq c \leq 0.3$, $0.1 \leq c \leq 0.2$, or $0.2 \leq c \leq 0.5$.

In certain embodiments, the cathode active material is doped with a dopant selected from the group consisting of Fe, Ni, Mn, Al, Mg, Zn, Ti, La, Ce, Sn, Zr, Ru, Si, Ge, and combinations thereof. In some embodiments, the dopant is not Fe, Ni, Mn, Mg, Zn, Ti, La, Ce, Ru, Si, or Ge. In certain embodiments, the dopant is not Al, Sn, or Zr.

The method disclosed herein is particularly suitable for preparing a cathode using a nickel-containing cathode active material. Nickel-containing cathodes prepared by the method disclosed herein have improved electrochemical performance and long-term stability.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$. In some embodiments, the transition metal oxide is selected from the group consisting of $Fe_2O_3$, $MnO_2$, $Al_2O_3$, $MgO$, $ZnO$, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 μm, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

In some embodiments, mixing the binder material and conductive agent in the first suspension can be done before adding the aqueous solution containing the lithium compound. This is advantageous as it allows better dispersion of materials in the second suspension. However, it is required to mix the binder material with the lithium compound before adding the cathode active material. In some embodiments, the binder material, the conductive agent and the lithium compound can be mixed to form a first suspension. In other embodiments, the binder material and the lithium compound can be mixed to form a first suspension. Thereafter, a second suspension is formed by dispersing the cathode active material and/or conductive agent in the first suspension. The conductive agent may be added at any step of the process before the homogenized slurry is formed.

Since the cathode active materials can react with water chemically, it is necessary to add the cathode active materials into an aqueous environment containing the lithium compounds. In some embodiments, the binder material and conductive agent can be mixed to form a first suspension. The cathode active material and the aqueous solution containing the lithium compound can be mixed to form a second suspension. Thereafter, a third suspension is formed by mixing the first and the second suspensions. In other embodiments, the cathode active material and the aqueous solution containing the lithium compound can be mixed to form a first suspension. In some embodiments, the binder material and conductive agent can be mixed to form a second suspension. Thereafter, a third suspension is formed by mixing the first and the second suspensions. In certain embodiments, the binder material and conductive agent are not mixed separately as a second suspension, but directly added in the first suspension and then homogenized by a homogenizer to obtain a homogenized slurry. When adding the binder material and conductive agent sequentially without forming the second suspension, stirring or dispersion may be employed between the additions.

In some embodiments, before homogenization of the third suspension, the third suspension is degassed under a reduced pressure for a short period of time to remove air bubbles trapped in the suspension. In some embodiments, the second suspension is degassed at a pressure from about 1 kPa to about 20 kPa, from about 1 kPa to about 15 kPa, from about 1 kPa to about 10 kPa, from about 5 kPa to about 20 kPa, from about 5 kPa to about 15 kPa, or from about 10 kPa to about 20 kPa. In certain embodiments, the suspension is degassed at a pressure less than 20 kPa, less than 15 kPa, or less than 10 kPa. In some embodiments, the suspension is degassed for a time period from about 30 minutes to about 4 hours, from about 1 hour to about 4 hours, from about 2 hours to about 4 hours, or from about 30 minutes to about 2 hours. In certain embodiments, the second suspension is degassed for a time period less than 4 hours, less than 2 hours, or less than 1 hour.

In certain embodiments, the third suspension is degassed after homogenization. The homogenized third suspension may also be degassed at the pressures and for the time durations stated in the step of degassing the third suspension before homogenization.

The third suspension is homogenized by a homogenizer at a temperature from about 10° C. to about 30° C. to obtain a homogenized slurry. The homogenizer may be equipped with a temperature control system and the temperature of the third suspension can be controlled by the temperature control system. Any homogenizer that can reduce or eliminate particle aggregation, and/or promote homogeneous distribution of slurry ingredients can be used herein. Homogeneous distribution plays an important role in fabricating batteries with good battery performance. In some embodiments, the homogenizer is a planetary stirring mixer, a stirring mixer, a blender, or an ultrasonicator.

In some embodiments, the third suspension is homogenized at a temperature from about 10° C. to about 30° C., from about 10° C. to about 25° C., from about 10° C. to about 20° C., or from about 10° C. to about 15° C. In some embodiments, the third suspension is homogenized at a temperature of less than 30° C., less than 25° C., less than 20° C., or less than 15° C.

In some embodiments, the planetary stirring mixer comprises at least one planetary blade and at least one high-speed dispersion blade. In certain embodiments, the rotational speed of the planetary blade is from about 20 rpm to about 200 rpm, from about 20 rpm to about 150 rpm, from about 30 rpm to about 150 rpm, or from about 50 rpm to about 100 rpm. In certain embodiments, the rotational speed of the dispersion blade is from about 1,000 rpm to about 4,000 rpm, from about 1,000 rpm to about 3,500 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 60 W/L, from about 40 W/L to about 50 W/L, from about 50 W/L to about 60 W/L, from about 20 W/L to about 80 W/L, from about 20 W/L to about 60 W/L, or from about 20 W/L to about 40 W/L. In certain embodiments, the ultrasonicator is operated at a power density of about 10 W/L, about 20 W/L, about 30 W/L, about 40 W/L, about 50 W/L, about 60 W/L, about 70 W/L, about 80 W/L, about 90 W/L, or about 100 W/L.

When the cathode active material is homogenized in an aqueous slurry for a long period of time, water can damage the cathode active material even under the presence of the lithium compound in the third suspension. In some embodiments, the third suspension is homogenized for a time period from about 10 minutes to about 6 hours, from about 10 minutes to about 5 hours, from about 10 minutes to about 4 hours, from about 10 minutes to about 3 hours, from about 10 minutes to about 2 hours, from about 10 minutes to about 1 hour, from about 10 minutes to about 30 minutes, from about 30 minutes to about 3 hours, from about 30 minutes to about 2 hours, from about 30 minutes to about 1 hour, from about 1 hour to about 6 hours, from about 1 hour to about 5 hours, from about 1 hour to about 4 hours, from about 1 hour to about 3 hours, from about 1 hour to about 2 hours, from about 2 hours to about 6 hours, from about 2 hours to about 4 hours, from about 2 hours to about 3 hours, from about 3 hours to about 5 hours, or from about 4 hours to about 6 hours. In certain embodiments, the third suspension is homogenized for a time period less than 6 hours, less than 5 hours, less than 4 hours, less than 3 hours, less than 2 hours, less than 1 hour, or less than 30 minutes. In some embodiments, the third suspension is homogenized for a time period of more than about 6 hours, more than about 5 hours, more than about 4 hours, more than about 3 hours, more than about 2 hours, more than about 1 hour, more than about 30 minutes, more than about 20 minutes, or more than about 10 minutes.

The most common method for achieving homogeneity is to use a high stirring rate, ideally inducing a turbulent flow. However, an increase in stirring rate usually leads to a huge increase in energy demand and the stresses required to achieve turbulent flow often exceed equipment capabilities. Moreover, such stresses can damage the cathode active material because some cathode active materials are shear-sensitive. An advantage of this invention is that the addition of the lithium compound stabilizes the pH of the slurry, which in turn stabilizes the viscosity of the slurry. This makes it easier to homogenize the slurry and results in efficient mixing under gentle stirring conditions. Another advantage of this invention is the reduction in the time required for the admixed components to reach homogeneity.

When the pH value of the slurry varies during homogenization or is outside of certain ranges, it may affect dispersion homogeneity and particle size distribution of the water-insoluble components, e.g., electrode active material and conductive agent in the slurry, thereby resulting in poor electrode performance. Accordingly, it is desirable to maintain a constant pH in the slurry during homogenization.

In some embodiments, the pH of the homogenized slurry is from about 8 to about 14, from about 8 to about 13.5, from about 8 to about 13, from about 8 to about 12.5, from about 8 to about 12, from about 8 to about 11.5, from about 8 to about 11, from about 8 to about 10.5, from about 8 to about 10, from about 8 to about 9, from about 9 to about 14, from about 9 to about 13, from about 9 to about 12, from about 9 to about 11, from about 10 to about 14, from about 10 to about 13, from about 10 to about 12, from about 10 to about 11, from about 10.5 to about 14, from about 10.5 to about 13.5, from about 10.5 to about 13, from about 10.5 to about 12.5, from about 10.5 to about 12, from about 10.5 to about 11.5, from about 11 to about 14, from about 11 to about 13, from about 11 to about 12, from about 11.5 to about 12.5, from about 11.5 to about 12, or from about 12 to about 14. In certain embodiments, the pH of the homogenized slurry is less than 14, less than 13.5, less than 13, less than 12.5, less than 12, less than 11.5, less than 11, less than 10.5, less than 10, less than 9.5, less than 9, less than 8.5, or less than 8. In some embodiments, the pH of the homogenized slurry is about 7.5, about 8, about 8.5, about 9, about 9.5, about 10, about 10.5, about 11, about 11.5, about 12, about 12.5, about 13, about 13.5 or about 14.

In certain embodiments, the amount of the conductive agent in the homogenized slurry is from about 0.5% to about 5%, from about 0.5% to about 3%, from about 1% to about 5%, from about 1% to about 4%, or from about 2% to about 3% by weight, based on the total weight of the homogenized slurry. In some embodiments, the amount of the conductive agent in the homogenized slurry is at least about 0.5%, at least about 1%, at least about 2%, at least about 3%, or at least about 4% by weight, based on the total weight of the homogenized slurry. In certain embodiments, the amount of the conductive agent in the homogenized slurry is at most about 1%, at most about 2%, at most about 3%, at most about 4%, or at most about 5% by weight, based on the total weight of the homogenized slurry.

In certain embodiments, the amount of the binder material in the homogenized slurry is from about 1% to about 15%, from about 1% to about 10%, from about 1% to about 5%, from about 3% to about 15%, from about 5% to about 15%, from about 5% to about 10%, or from about 10% to about 15% by weight, based on the total weight of the homogenized slurry. In some embodiments, the amount of the binder material in the homogenized slurry is less than 15%, less than 10%, less than 8%, or less than 6% by weight, based on the total weight of the homogenized slurry.

In some embodiments, the weight of the binder material is greater than, smaller than, or equal to the weight of the conductive agent in the homogenized slurry. In certain embodiments, the ratio of the weight of the binder material to the weight of the conductive agent is from about 1:10 to about 10:1, from about 1:10 to about 5:1, from about 1:10 to about 1:1, from about 1:10 to about 1:5, from about 1:5 to about 5:1, from about 1:3 to about 3:1, from about 1:2 to about 2:1, or from about 1:1.5 to about 1.5:1.

In certain embodiments, the amount of the cathode active material in the homogenized slurry is at least 20%, at least 30%, at least 35%, at least 40%, at least 45%, at least 50%, at least 55%, or at least 60% by weight, based on the total weight of the homogenized slurry. In some embodiments, the amount of the cathode active material in the homogenized slurry is at most 50%, at most 55%, at most 60%, at most 65%, at most 70%, or at most 75% by weight, based on the total weight of the homogenized slurry.

In some embodiments, the amount of the cathode active material in the homogenized slurry is from about 20% to about 70%, from about 20% to about 65%, from about 20% to about 60%, from about 20% to about 55%, from about 20% to about 50%, from about 20% to about 40%, from about 20% to about 30%, from about 30% to about 70%, from about 30% to about 65%, from about 30% to about 60%, from about 30% to about 55%, from about 30% to about 50%, from about 40% to about 70%, from about 40% to about 65%, from about 40% to about 60%, from about 40% to about 55%, from about 40% to about 50%, from about 50% to about 70%, or from about 50% to about 60% by weight, based on the total weight of the homogenized slurry. In certain embodiments, the amount of the cathode active material in the homogenized slurry is about 20%, about 30%, about 45%, about 50%, about 65%, or about 70% by weight, based on the total weight of the homogenized slurry.

In some embodiments, the solid content of the homogenized slurry is from about 40% to about 80%, from about 45% to about 75%, from about 45% to about 70%, from about 45% to about 65%, from about 45% to about 60%, from about 45% to about 55%, from about 45% to about 50%, from about 50% to about 75%, from about 50% to about 70%, from about 50% to about 65%, from about 55% to about 75%, from about 55% to about 70%, from about 60% to about 75%, or from about 65% to about 75% by weight, based on the total weight of the homogenized slurry. In certain embodiments, the solid content of the homogenized slurry is about 40%, about 45%, about 50%, about 55%, about 60%, about 65%, about 70%, about 75%, or about 80% by weight, based on the total weight of the homogenized slurry. In certain embodiments, the solid content of the homogenized slurry is at least 40%, at least 45%, at least 50%, at least 55%, at least 60%, at least 65%, or at least 70% by weight, based on the total weight of the homogenized slurry. In certain embodiments, the solid content of the homogenized slurry is less than 75%, less than 70%, less than 65%, less than 60%, less than 55%, or less than 50% by weight, based on the total weight of the homogenized slurry.

The homogenized slurry of the present invention can have a higher solid content than conventional cathode slurries. This allows more cathode active material to be prepared for further processing at any one time, thus improving efficiency and maximizing productivity.

The solvent used in the homogenized slurry disclosed herein can comprise at least one alcohol. The addition of the alcohol can improve the processability of the slurry and lower the freezing point of water. Some non-limiting examples of suitable alcohol include ethanol, isopropanol, n-propanol, tert-butanol, n-butanol, and combinations thereof. The total amount of the alcohol can range from about 1% to about 30%, from about 1% to about 20%, from about 1% to about 10%, from about 1% to about 5%, from about 1% to about 3%, from about 3% to about 30%, from about 3% to about 20%, from about 3% to about 10%, from about 5% to about 20%, from about 5% to about 15%, from about 5% to about 10%, or from about 8% to about 15% by weight, based on the total weight of the homogenized slurry. In some embodiments, the slurry does not comprise an alcohol.

The viscosity of the homogenized slurry is preferably less than about 8,000 mPa·s. In some embodiments, the viscosity of the homogenized slurry is from about 1,000 mPa·s to about 8,000 mPa·s, from about 1,000 mPa·s to about 7,000 mPa·s, from about 1,000 mPa·s to about 6,000 mPa·s, from about 1,000 mPa·s to about 5,000 mPa·s, from about 1,000 mPa·s to about 4,000 mPa·s, from about 1,000 mPa·s to about 3,000 mPa·s, or from about 1,000 mPa·s to about 2,000 mPa·s. In certain embodiments, the viscosity of the homogenized slurry is less than 8,000 mPa·s, less than 7,000 mPa·s, less than 6,000 mPa·s, less than 5,000 mPa·s, less than 4,000 mPa·s, less than 3,000 mPa·s, or less than 2,000 mPa·s. In some embodiments, the viscosity of the homogenized slurry is about 1,000 mPa·s, about 2,000 mPa·s, about 3,000 mPa·s, about 4,000 mPa·s, about 5,000 mPa·s, about 6,000 mPa·s, about 7,000 mPa·s, or about 8,000 mPa·s. Thus, the resultant slurry can be fully mixed or homogeneous.

At an alkaline pH, the surface chemistry of the cathode active material may change, thereby affecting dispersion homogeneity and particle size distribution of the electrode components (e.g., the cathode active material and conductive agent) in the cathode slurry.

Figure 2:
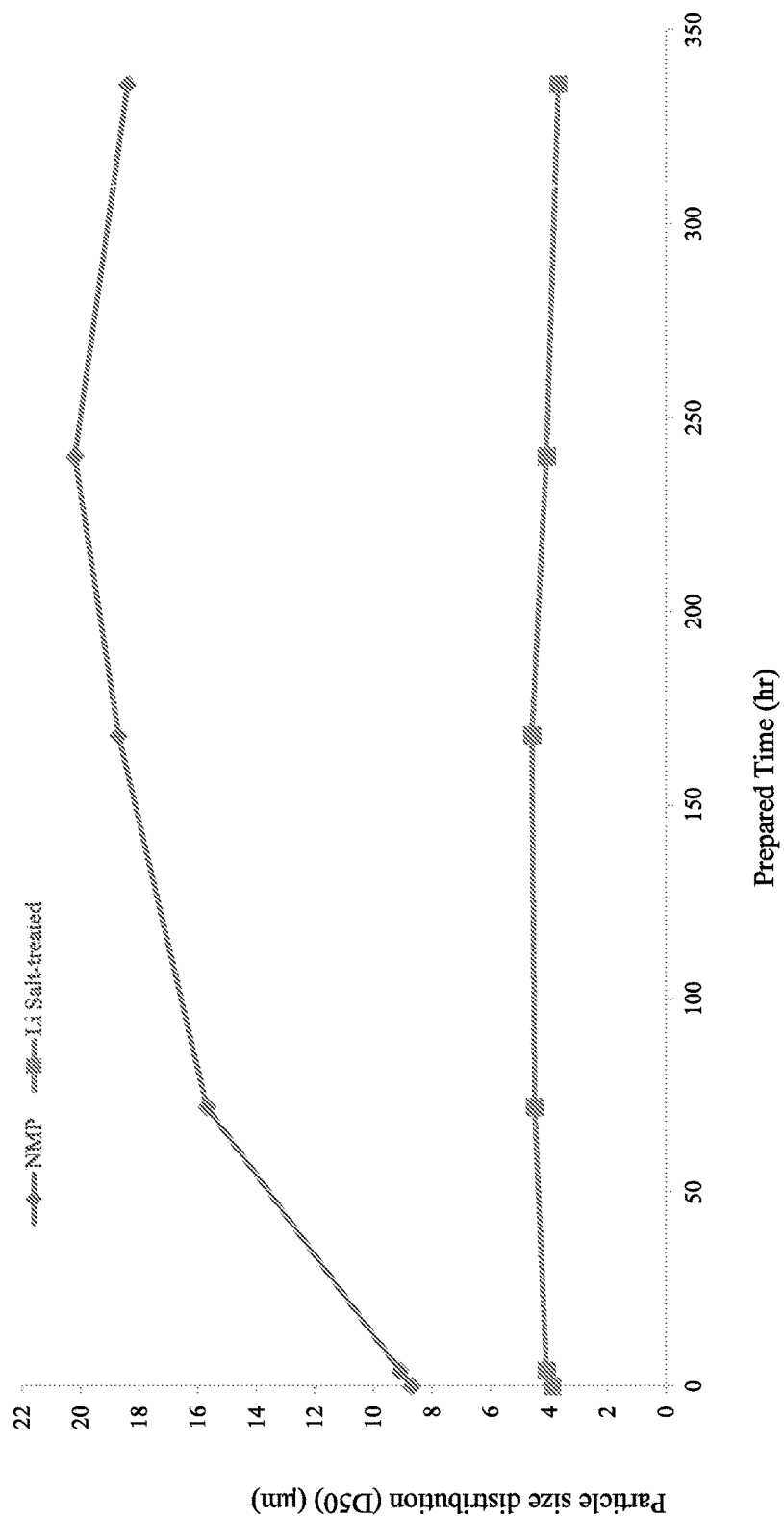
FIG. 2 depicts the D50 particle size distribution of the organic and base-treated slurries respectively.

The cathode slurry disclosed herein has a small D50, and a uniform and narrow particle size distribution. FIG. 2 depicts the D50 size of cathode active material particles in an NMP-based slurry and a base-treated slurry of the present invention respectively. It can be seen that the D50 of the NMP-based slurry is rather large and fluctuates significantly, while the D50 of the base-treated slurry remains small and constant over time. This shows that the particles of the base-treated slurry of the present invention do not agglomerate or break apart over time, so the slurry maintains a high and stable level of dispersion even after a long period of storage. This not only improves the lifespan of the lithium-ion batteries made therefrom, but also improves production efficiency as slurries can be used long after being prepared without fear of any changes in the dispersion of the slurry particles.

The cathode slurry disclosed herein has a small D50, and a uniform and narrow particle size distribution. In some embodiments, the cathode slurry of the present invention has a particle size D50 in the range from about 1 μm to about 15 μm, from about 1 μm to about 12 μm, from about 1 μm to about 10 μm, from about 1 μm to about 8 μm, from about 1 μm to about 6 μm, from about 3 μm to about 15 μm, from about 3 μm to about 12 μm, from about 3 μm to about 10 μm, from about 3 μm to about 8 μm, from about 3 μm to about 6 μm, from about 4 μm to about 15 μm, from about 4 μm to about 12 μm, from about 4 μm to about 10 μm, from about 4 μm to about 8 μm, from about 4 μm to about 6 μm, from about 6 μm to about 15 μm, from about 6 μm to about 12 μm, from about 6 μm to about 10 μm, from about 6 μm to about 8 μm, from about 6 μm to about 15 μm, from about 8 μm to about 15 μm, from about 8 μm to about 12 μm, from about 8 μm to about 10 μm, from about 10 μm to about 15 μm, from about 10 μm to about 12 μm, or from about 11 μm to about 15 μm. In certain embodiments, the particle size D50 of the cathode active material is less than 15 μm, less than 12 μm, less than 10 μm, less than 8 μm, less than 6 μm, or less than 4 μm. In some embodiments, the particle diameter D50 of the cathode active material is greater than 1 μm, greater than 3 μm, greater than 4 μm, greater than 6 μm, greater than 8 μm, greater than 10 μm, or greater than 11 μm.

In conventional methods of preparing cathode slurries, a dispersing agent may be used to assist in dispersing the cathode active material, conductive agent and binder material in the slurry. Some non-limiting examples of the dispersing agent include a polymeric acid and a surfactant that can lower the surface tension between a liquid and a solid. In some embodiments, the dispersing agent is a nonionic surfactant, an anionic surfactant, a cationic surfactant, an amphoteric surfactant, or a combination thereof.

One of the advantages of the present invention is that the slurry components can be dispersed homogeneously at room temperature without the use of a dispersing agent. In some embodiments, the method of the present invention does not comprise a step of adding a dispersing agent to the first suspension, second suspension, third suspension or the homogenized slurry. In certain embodiments, each of the first suspension, the second suspension, the third suspension and the homogenized slurry is independently free of a dispersing agent.

Some non-limiting examples of the polymeric acid include polylactic acid, polysuccinic acid, polymaleic acid, pyromucic acid, polyfumaric acid, polysorbic acid, polylinoleic acid, polylinolenic acid, polyglutamic acid, polymethacrylic acid, polylicanic acid, polyglycolic acid, polyaspartic acid, polyamic acid, polyformic acid, polyacetic acid, polypropionic acid, polybutyric acid, polysebacic acid, copolymers thereof, and combinations thereof. In certain embodiments, the homogenized slurry is free of a polymeric acid.

Some non-limiting examples of suitable nonionic surfactants include a carboxylic ester, a polyethylene glycol ester, and combinations thereof. In some embodiments, the homogenized slurry is free of a nonionic surfactant.

Some non-limiting examples of suitable anionic surfactants include a salt of an alkyl sulfate, an alkyl polyethoxylate ether sulfate, an alkyl benzene sulfonate, an alkyl ether sulfate, a sulfonate, a sulfosuccinate, a sarcosinate, and combinations thereof. In some embodiments, the anionic surfactant comprises a cation selected from the group consisting of sodium, potassium, ammonium, and combinations thereof. In certain embodiments, the anionic surfactant is sodium dodecylbenzene sulfonate, sodium stearate, lithium dodecyl sulfate, or a combination thereof. In some embodiments, the homogenized slurry is free of an anionic surfactant.

Some non-limiting examples of suitable cationic surfactants include an ammonium salt, a phosphonium salt, an imidazolium salt, a sulfonium salt, and combinations thereof. Some non-limiting examples of suitable ammonium salt include stearyl trimethylammonium bromide (STAB), cetyl trimethylammonium bromide (CTAB), myristyl trimethylammonium bromide (MTAB), trimethylhexadecyl ammonium chloride, and combinations thereof. In some embodiments, the homogenized slurry is free of a cationic surfactant.

Some non-limiting examples of suitable amphoteric surfactants are surfactants that contain both cationic and anionic groups. The cationic group is ammonium, phosphonium, imidazolium, sulfonium, or a combination thereof. The anionic hydrophilic group is carboxylate, sulfonate, sulfate, phosphonate, or a combination thereof. In some embodiments, the homogenized slurry is free of an amphoteric surfactant.

After uniform mixing of slurry components, the homogenized slurry can be applied on a current collector to form a coated film on the current collector, followed by drying in step 104. The current collector acts to collect electrons generated by electrochemical reactions of the cathode active material or to supply electrons required for the electrochemical reactions. In some embodiments, the current collector can be in the form of a foil, sheet or film. In certain embodiments, the current collector is stainless steel, titanium, nickel, aluminum, copper, or alloys thereof or electrically-conductive resin. In certain embodiments, the current collector has a two-layered structure comprising an outer layer and an inner layer, wherein the outer layer comprises a conductive material and the inner layer comprises an insulating material or another conductive material; for example, aluminum mounted with a conductive resin layer or a polymeric insulating material coated with an aluminum film. In some embodiments, the current collector has a three-layered structure comprising an outer layer, a middle layer and an inner layer, wherein the outer and inner layers comprise a conductive material and the middle layer comprises an insulating material or another conductive material; for example, a plastic substrate coated with a metal film on both sides. In certain embodiments, each of the outer layer, middle layer and inner layer is independently stainless steel, titanium, nickel, aluminum, copper, or alloys thereof or electrically-conductive resin. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

In certain embodiments, the thickness of each of the cathode and anode electrode layers on the current collector is independently from about 5 μm to about 50 μm, from about 5 μm to about 25 μm, from about 10 μm to about 90 μm, from about 10 μm to about 50 μm, from about 10 μm to about 30 μm, from about 15 μm to about 90 μm, from about 20 μm to about 90 μm, from about 25 μm to about 90 μm, from about 25 μm to about 80 μm, from about 25 μm to about 75 μm, from about 25 μm to about 50 μm, from about 30 μm to about 90 μm, from about μm to about 80 μm, from about 35 μm to about 90 μm, from about 35 μm to about 85 μm, from about 35 μm to about 80 μm, or from about 35 μm to about 75 μm. In some embodiments, the thickness of the electrode layer on the current collector is about 25 μm, about 30 μm, about 35 μm, about 40 μm, about 45 μm, about 50 μm, about 55 μm, about 60 μm, about 65 μm, about 70 μm, or about 75 μm.

In some embodiments, the surface density of each of the cathode and anode electrode layers on the current collector is independently from about 1 mg/cm$^2$ to about 40 mg/cm$^2$, from about 1 mg/cm$^2$ to about 35 mg/cm$^2$, from about 1 mg/cm$^2$ to about 30 mg/cm$^2$, from about 1 mg/cm$^2$ to about 25 mg/cm$^2$, from about 1 mg/cm$^2$ to about 15 mg/cm$^2$, from about 3 mg/cm$^2$ to about 40 mg/cm$^2$, from about 3 mg/cm$^2$ to about 35 mg/cm$^2$, from about 3 mg/cm$^2$ to about 30 mg/cm$^2$, from about 3 mg/cm$^2$ to about 25 mg/cm$^2$, from about 3 mg/cm$^2$ to about 20 mg/cm$^2$, from about 3 mg/cm$^2$ to about 15 mg/cm$^2$, from about 5 mg/cm$^2$ to about 40 mg/cm$^2$, from about 5 mg/cm$^2$ to about 35 mg/cm$^2$, from about 5 mg/cm$^2$ to about 30 mg/cm$^2$, from about 5 mg/cm$^2$ to about 25 mg/cm$^2$, from about 5 mg/cm$^2$ to about 20 mg/cm$^2$, from about 5 mg/cm$^2$ to about 15 mg/cm$^2$, from about 8 mg/cm$^2$ to about 40 mg/cm$^2$, from about 8 mg/cm$^2$ to about 35 mg/cm$^2$, from about 8 mg/cm$^2$ to about 30 mg/cm$^2$, from about 8 mg/cm$^2$ to about 25 mg/cm$^2$, from about 8 mg/cm$^2$ to about 20 mg/cm$^2$, from about 10 mg/cm$^2$ to about 40 mg/cm$^2$, from about 10 mg/cm$^2$ to about 35 mg/cm$^2$, from about 10 mg/cm$^2$ to about 30 mg/cm$^2$, from about 10 mg/cm$^2$ to about 25 mg/cm$^2$, from about 10 mg/cm$^2$ to about 20 mg/cm$^2$, from about 15 mg/cm$^2$ to about 40 mg/cm$^2$, or from about 20 mg/cm$^2$ to about 40 mg/cm$^2$.

In some embodiments, a conductive layer can be coated on an aluminum current collector to improve its current conductivity. In certain embodiments, the conductive layer comprises a material selected from the group consisting of carbon, carbon black, graphite, expanded graphite, graphene, graphene nanoplatelets, carbon fibers, carbon nano-fibers, graphitized carbon flake, carbon tubes, carbon nano-tubes, activated carbon, mesoporous carbon, and combinations thereof. In some embodiments, the conductive agent is not carbon, carbon black, graphite, expanded graphite, graphene, graphene nanoplatelets, carbon fibers, carbon nano-fibers, graphitized carbon flake, carbon tubes, carbon nanotubes, activated carbon, or mesoporous carbon.

In some embodiments, the conductive layer has a thickness from about 0.5 μm to about 5.0 μm. Thickness of the conductive layer will affect the volume occupied by the current collector within a battery and the amount of the electrode material and hence the capacity in the battery.

In certain embodiments, the thickness of the conductive layer on the current collector is from about 0.5 μm to about 4.5 μm, from about 1.0 μm to about 4.0 μm, from about 1.0 μm to about 3.5 μm, from about 1.0 μm to about 3.0 μm, from about 1.0 μm to about 2.5 μm, from about 1.0 μm to about 2.0 μm, from about 1.1 μm to about 2.0 μm, from about 1.2 μm to about 2.0 μm, from about 1.5 μm to about 2.0 μm, from about 1.8 μm to about 2.0 μm, from about 1.0 μm to about 1.8 μm, from about 1.2 μm to about 1.8 μm, from about 1.5 μm to about 1.8 μm, from about 1.0 μm to about 1.5 μm, or from about 1.2 μm to about 1.5 μm. In some embodiments, the thickness of the conductive layer on the current collector is less than 4.5 μm, less than 4.0 μm, less than 3.5 μm, less than 3.0 μm, less than 2.5 μm, less than 2.0 μm, less than 1.8 μm, less than 1.5 μm, or less than 1.2 μm. In some embodiments, the thickness of the conductive layer on the current collector is more than 1.0 μm, more than 1.2 μm, more than 1.5 μm, more than 1.8 μm, more than 2.0 μm, more than 2.5 μm, more than 3.0 μm, or more than 3.5 μm.

In addition, the cathode prepared by the present invention exhibits strong adhesion of the electrode layer to the current collector. It is important for the electrode layer to have good peeling strength to the current collector as this prevents delamination or separation of the electrode, which would greatly influence the mechanical stability of the electrodes and the cyclability of the battery. Therefore, the electrodes should have sufficient peeling strength to withstand the rigors of battery manufacture.

Figure 3:
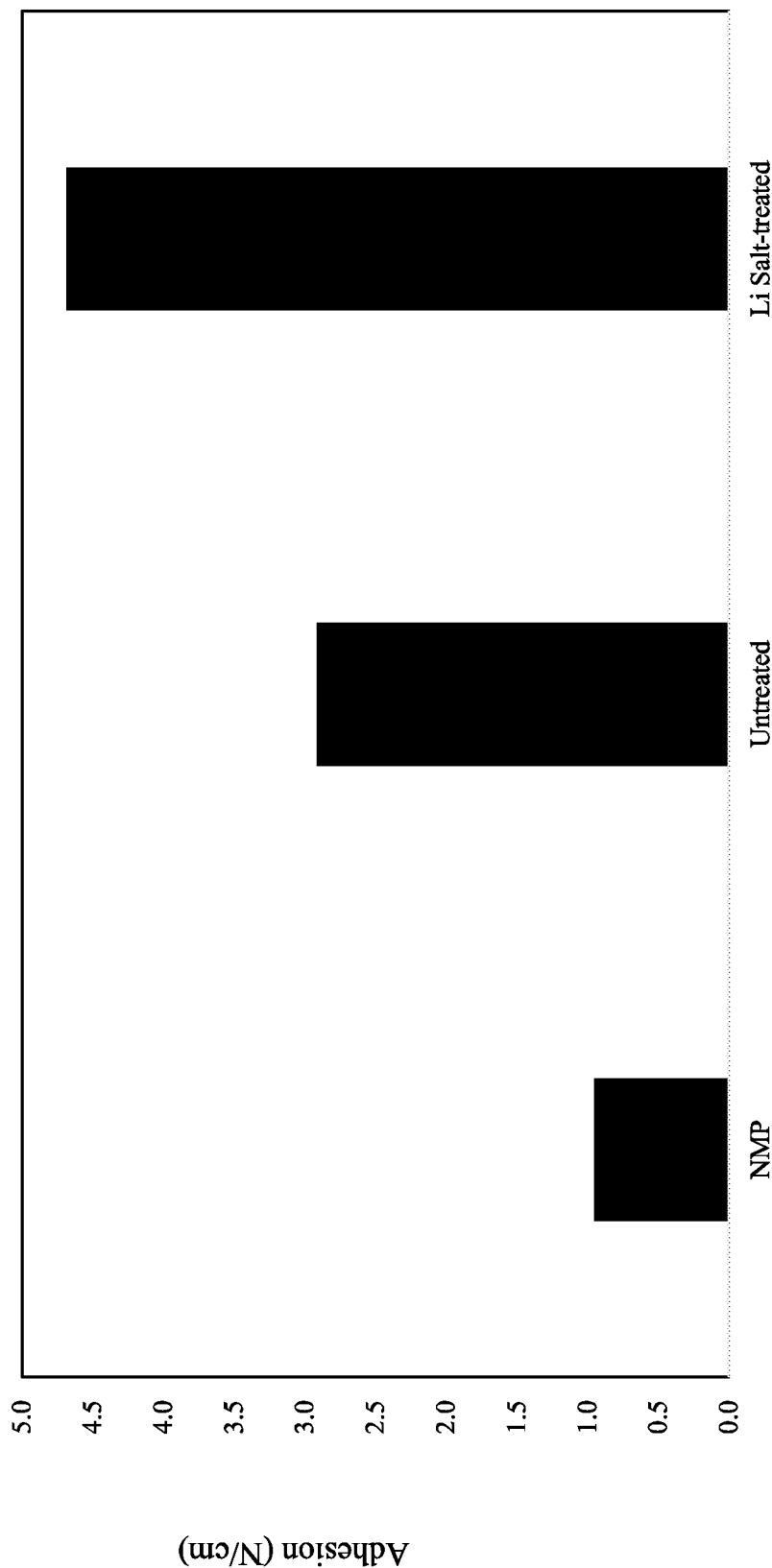
FIG. 3 is a bar graph showing the peeling strengths of electrodes prepared by different methods.

FIG. 3 is a bar graph showing the peeling strengths of cathodes coated respectively with an organic slurry, an aqueous slurry comprising untreated cathode active material and an aqueous slurry prepared according to the present invention. The graph shows an increase in the peeling strength of the coated film to the current collector for the electrode prepared by the method disclosed herein.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm. In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, or 5.5 N/cm or more. In some embodiments, the peeling strength between the current collector and the electrode layer is less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

During coating, pH is a very important parameter in controlling the slurry's stability as it affects key properties of the slurry, such as viscosity and degree of dispersion. If the slurry pH changes, then such key properties will also change. The risk of pH instability causes a need to coat the slurry on the current collector immediately after homogenization. This is very difficult to realize under mass production conditions, where the coating processes often continue for many hours. Any fluctuations in the key properties during coating are a severe issue and will make the coating process unstable. One benefit of the present invention is that the slurry pH, and thus the key properties, remain stable during homogenization and also for a long time after homogenization. It is found that the pH of the slurry disclosed herein remains relatively constant during extended stagnant storage of up to two weeks, while the pH of conventional water-based slurries rises significantly during storage. The stability of the pH allows the slurry disclosed herein to remain homogenous and uniform during such extended storage, allowing sufficient time for transportation of the slurry to proceed to the coating process.

In some embodiments, the concentration of lithium ions (Li+) in the cathode slurry is from about 0.0001 M to about 1 M. In certain embodiments, the concentration of $Li^+$ in the cathode slurry is from about 0.0001 M to about 0.9 M, from about 0.0001 M to about 0.85 M, from about 0.0001 M to about 0.8 M, from about 0.0001 M to about 0.75 M, from about 0.0001 M to about 0.7 M, from about 0.0001 M to about 0.65 M, from about 0.0001 M to about 0.6 M, from about 0.0001 M to about 0.55 M, from about 0.0001 M to about 0.5 M, from about 0.0001 M to about 0.45 M, from about 0.0001 M to about 0.4 M, from about 0.0001 M to about 0.35 M, from about 0.0001 M to about 0.3 M, from about 0.0001 M to about 0.25 M, from about 0.0001 M to about 0.2 M, from about 0.0001 M to about 0.15 M, from about 0.0001 M to about 0.1 M, from about 0.0001 M to about 0.05 M, from about 0.0001 M to about 0.01 M, from about 0.0001 M to about 0.005 M, from about 0.0001 M to about 0.001 M, from about 0.001 M to about 0.6 M, from about 0.001 M to about 0.55 M, from about 0.001 M to about 0.5 M, from about 0.001 M to about 0.45 M, from about 0.001 M to about 0.4 M, from about 0.001 M to about 0.35 M, from about 0.001 M to about 0.3 M, from about 0.001 M to about 0.25 M, from about 0.001 M to about 0.2 M, from about 0.001 M to about 0.1 M, from about 0.001 M to about 0.05 M, from about 0.001 M to about 0.01 M, from about 0.01 M to about 0.6 M, from about 0.01 M to about 0.55 M, from about 0.01 M to about 0.5 M, from about 0.01 M to about 0.45 M, from about 0.01 M to about 0.4 M, from about 0.01 M to about 0.35 M, from about 0.01 M to about 0.3 M, from about 0.01 M to about 0.25 M, from about 0.01 M to about 0.2 M, from about 0.01 M to about 0.1 M, from about 0.1 M to about 0.6 M, from about 0.1 M to about 0.55 M, from about 0.1 M to about 0.5 M, from about 0.1 M to about 0.45 M, from about 0.1 M to about 0.4 M, from about 0.1 M to about 0.35 M, from about 0.1 M to about 0.3 M, from about 0.2 M to about 0.6 M, from about 0.2 M to about 0.55 M, from about 0.2 M to about 0.5 M, from about 0.2 M to about 0.45 M, from about 0.2 M to about 0.4 M, from about 0.2 M to about 0.35 M, from about 0.2 M to about 0.3 M, from about 0.3 M to about 0.6 M, from about 0.3 M to about 0.55 M, from about 0.3 M to about 0.5 M, from about 0.35 M to about 0.6 M, from about 0.35 M to about 0.55 M, from about 0.35 M to about 0.5 M, from about 0.4 M to about 0.6 M, from about 0.4 M to about 0.55 M, or from about 0.4 M to about 0.5 M. In certain embodiments, the concentration of $Li^+$ in the cathode slurry is at least about 0.0001 M, at least about 0.0005 M, at least about 0.001 M, at least about 0.005 M, at least about 0.01 M, at least about 0.05 M, at least about 0.1 M, at least about 0.2 M, at least about 0.3 M, at least about 0.35 M, at least about 0.4 M, at least about 0.45 M, at least about 0.5 M, at least about 0.55 M, at least about 0.6 M, at least about 0.65 M, at least about 0.7 M, at least about 0.75 M, at least about 0.8 M, at least about 0.85 M, or at least about 0.9 M. In certain embodiments, the concentration of $Li^+$ in the cathode slurry is less than about 1 M, less than about 0.95 M, less than about 0.9 M, less than about 0.85 M, less than about 0.8 M, less than about 0.75 M, less than about 0.7 M, less than about 0.65 M, less than about 0.6 M, less than about 0.55 M, less than about 0.5 M, less than about 0.45 M, less than about 0.4 M, less than about 0.35 M, less than about 0.3 M, less than about 0.25 M, less than about 0.2 M, less than about 0.15 M, less than about 0.1 M, less than about 0.05 M, less than about 0.01 M, less than about 0.005 M, or less than about 0.001 M.

In certain embodiments, the pH of the cathode slurry is from about 10 to about 14, from about 10 to about 13, from about 10 to about 12, from about 10 to about 11.8, from about 10 to about 11.5, from about 10.3 to about 11.8, from about 11 to about 14, from about 11 to about 13, or from about 12 to about 14. In some embodiments, the pH of the cathode slurry is less than about 13, less than about 12.5, less than about 12, less than about 11.5, less than about 11, less than about 10.5, less than about 10, or less than about 9. In certain embodiments, the pH of the cathode slurry is higher than about 10, higher than about 10.5 higher than about 11, higher than about 11.5, higher than about 12, higher than about 12.5, or higher than about 13.

The slurry should maintain a stable pH during homogenization, as an unstable pH can significantly reduce the lifetime of the battery. In general, when there is the presence of lithium compound in slurry, the slurry pH was found to change only slightly during homogenization. In certain embodiments, the change in pH observed during homogenization is from about 0.01 pH units to about 0.5 pH units, from about 0.01 pH units to about 0.45 pH units, from about 0.01 pH units to about 0.4 pH units, from about 0.01 pH units to about 0.35 pH units, from about 0.01 pH units to about 0.3 pH units, from about 0.01 pH units to about 0.25 pH units, from about 0.01 pH units to about 0.2 pH units, from about 0.01 pH units to about 0.15 pH units, or from about 0.01 pH units to about 0.1 pH units. In certain embodiments, the decrease in pH observed during homogenization is less than 0.5 pH unit, less than 0.45 pH units, less than 0.4 pH units, less than 0.35 pH units, less than 0.3 pH units, less than 0.2 pH units, or less than 0.1 pH units.

The thickness of the current collector affects the volume it occupies within the battery, the amount of the electrode active material needed, and hence the capacity in the battery. In some embodiments, the current collector has a thickness from about 5 μm to about 30 μm. In certain embodiments, the current collector has a thickness from about 5 μm to about 20 μm, from about 5 μm to about 15 μm, from about 10 μm to about 30 μm, from about 10 μm to about μm, or from about 10 μm to about 20 μm.

In certain embodiments, the coating process is performed using a doctor blade coater, a slot-die coater, a transfer coater, a spray coater, a roll coater, a gravure coater, a dip coater, or a curtain coater.

Evaporating the solvent to create a dry porous electrode is needed to fabricate the battery. After applying the homogenized slurry on a current collector, the coated film on the current collector can be dried by a dryer to obtain the battery electrode. Any dryer that can dry the coated film on the current collector can be used herein. Some non-limiting examples of the dryer include a batch drying oven, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

In some embodiments, the conveyor drying oven for drying the coated film on the current collector includes one or more heating sections, wherein each of the heating sections is individually temperature-controlled, and wherein each of the heating sections may include independently controlled heating zones.

In certain embodiments, the conveyor drying oven comprises a first heating section positioned on one side of the conveyor and a second heating section positioned on an opposing side of the conveyor from the first heating section, wherein each of the first and second heating sections independently comprises one or more heating elements and a temperature control system connected to the heating elements of the first heating section and the second heating section in a manner to monitor and selectively control the temperature of each heating section.

In some embodiments, the conveyor drying oven comprises a plurality of heating sections, wherein each heating section includes independent heating elements that are operated to maintain a constant temperature within the heating section.

In certain embodiments, each of the first and second heating sections independently has an inlet heating zone and an outlet heating zone, wherein each of the inlet and outlet heating zones independently comprises one or more heating elements and a temperature control system connected to the heating elements of the inlet heating zone and the outlet heating zone in a manner to monitor and selectively control the temperature of each heating zone separately from the temperature control of the other heating zones.

The coated film on the current collector should be dried at a temperature of approximately 75° C. or less in approximately 20 minutes or less. Drying the coated positive electrode at temperatures above 75° C. may result in undesirable deformation of the cathode, thus affecting the performance of the positive electrode.

In some embodiments, the coated film on the current collector can be dried at a temperature from about 25° C. to about 75° C. In certain embodiments, the coated film on the current collector can be dried at a temperature from about 25° C. to about 70° C., from about 25° C. to about 65° C., from about 25° C. to about 60° C., from about 25° C. to about 55° C., from about 25° C. to about 50° C., from about 25° C. to about 45° C., from about 25° C. to about 40° C., from about 30° C. to about 75° C., from about 30° C. to about 70° C., from about 30° C. to about 65° C., from about 30° C. to about 60° C., from about 30° C. to about 55° C., from about 30° C. to about 50° C., from about 35° C. to about 75° C., from about 35° C. to about 70° C., from about 35° C. to about 65° C., from about 35° C. to about 60° C., from about 40° C. to about 75° C., from about 40° C. to about 70° C., from about 40° C. to about 65° C., or from about 40° C. to about 60° C. In some embodiments, the coated film on the current collector is dried at a temperature less than 75° C., less than 70° C., less than 65° C., less than 60° C., less than 55° C., or less than 50° C. In some embodiments, the coated film on the current collector is dried at a temperature of higher than about 70° C., higher than about 65° C., higher than about 60° C., higher than about 55° C., higher than about 50° C., higher than about 45° C., higher than about 40° C., or higher than about 35° C., higher than about 30° C., or higher than about 25° C.

In certain embodiments, the conveyor moves at a speed from about 1 meter/minute to about 120 meters/minute, from about 1 meter/minute to about 100 meters/minute, from about 1 meter/minute to about 80 meters/minute, from about 1 meter/minute to about 60 meters/minute, from about 1 meter/minute to about 40 meters/minute, from about 10 meters/minute to about 120 meters/minute, from about 10 meters/minute to about 80 meters/minute, from about 10 meters/minute to about 60 meters/minute, from about 10 meters/minute to about 40 meters/minute, from about 25 meters/minute to about 120 meters/minute, from about 25 meters/minute to about 100 meters/minute, from about 25 meters/minute to about 80 meters/minute, from about 50 meters/minute to about 60 meters/minute, from about 50 meters/minute to about 120 meters/minute, from about 50 meters/minute to about 100 meters/minute, from about 75 meters/minute to about 80 meters/minute, from about 75 meters/minute to about 120 meters/minute, from about 2 meters/minute to about 100 meters/minute, from about 2 meters/minute to about 25 meters/minute, from about 2 meters/minute to about 20 meters/minute, from about 3 meters/minute to about 16 meters/minute, from about 3 meters/minute to about 30 meters/minute, from about 3 meters/minute to about 20 meters/minute, or from about 3 meters/minute to about 16 meters/minute.

Controlling the conveyor length and speed can regulate the drying time of the coated film. In some embodiments, the coated film on the current collector can be dried for a time period from about 1 minute to about 30 minutes, from about 1 minute to about 25 minutes, from about 2 minutes to about 20 minutes, from about 2 minutes to about 17 minutes, from about 2 minutes to about 15 minutes, from about 2 minutes to about 14 minutes, from about 2 minutes to about 10 minutes, from about 2 minutes to about 11 minutes, from about 2 minutes to about 8 minutes, from about 5 minutes to about 30 minutes, from about 5 minutes to about 20 minutes, from about 5 minutes to about 11 minutes, from about 5 minutes to about 14 minutes, from about 5 minutes to about 17 minutes, from about 5 minutes to about 10 minutes, from about 10 minutes to about 30 minutes, or from about 10 minutes to about 20 minutes. In certain embodiments, the coated film on the current collector can be dried for a time period of less than 5 minutes, less than 8 minutes, less than 10 minutes, less than 11 minutes, less than 14 minutes, less than 17 minutes, or less than 20 minutes. In some embodiments, the coated film on the current collector can be dried for a time period of about 5 minutes, about 8 minutes, about 10 minutes, about 11 minutes, about 14 minutes, about 17 minutes, or about 20 minutes.

Since the cathode active materials are sufficiently active to react with water chemically, it is necessary to control the total processing time of the method especially steps 1)-5). In some embodiments, the total processing time for steps 1)-5) is from about 2 hours to about 8 hours, from about 2 hours to about 7 hours, from about 2 hours to about 6 hours, from about 2 hours to about 5 hours, from about 2 hours to about 4 hours, or from about 2 hours to about 3 hours. In certain embodiments, the total processing time for steps 1)-5) is less than 8 hours, less than 7 hours, less than 6 hours, less than 5 hours, less than 4 hours, or less than 3 hours. In some embodiments, the total processing time for steps 1)-5) is about 8 hours, about 7 hours, about 6 hours, about 5 hours, about 4 hours, about 3 hours, or about 2 hours.

In some embodiments, the total processing time for steps 1)-4) or steps 3)-5) is from about 2 hours to about 8 hours, from about 2 hours to about 7 hours, from about 2 hours to about 6 hours, from about 2 hours to about 5 hours, from about 2 hours to about 4 hours, or from about 2 hours to about 3 hours. In certain embodiments, the total processing time for steps 1)-4) is less than 8 hours, less than 7 hours, less than 6 hours, less than 5 hours, less than 4 hours, less than 3 hours, or less than 2 hours.

In some embodiments, the total processing time for steps 4)-5) is from about 5 minutes to about 2 hours, from about 5 minutes to about 1.5 hours, from about 5 minutes to about 1 hour, from about 5 minutes to about 30 minutes, from about 10 minutes to about 2 hours, from about 10 minutes to about 1.5 hours, from about 10 minutes to about 1 hour, from about 10 minutes to about 30 minutes, from about 15 minutes to about 2 hours, from about 15 minutes to about 1.5 hours, from about 15 minutes to about 1 hour, or from about 15 minutes to about 30 minutes. In certain embodiments, the total processing time for steps 4)-5) is less than 2 hours, less than 1.5 hours, less than 1 hours, less than 45 minutes, less than 30 minutes, less than 25 minutes, less than 20 minutes, less than 10 minutes, or less than 5 minutes.

After the coated film on the current collector is dried, a cathode is formed. In some embodiments, the cathode is compressed mechanically in order to enhance the density of the cathode.

The method disclosed herein has the advantage that aqueous solvents can be used in the manufacturing process, which can save on processing time and equipment, as well as improve safety by eliminating the need to handle or recycle hazardous organic solvents. In addition, costs are reduced by simplifying the overall process. Therefore, this method is especially suited for industrial processes because of its low cost and ease of handling.

As described above, by adding the cathode active material to the lithium compound disclosed herein, the slurry preparation method disclosed herein has a controlled cathode slurry pH, favorably enhancing the slurry's stability. The development of water-based cathode slurries without lowering the battery performance such as cyclability and capacity is achieved by the present invention. Batteries comprising positive electrodes prepared in accordance with the present invention show high cycle stability. In addition, the low drying temperatures and decreased drying times of the coated film significantly improve performance of the batteries.

Figure 4:
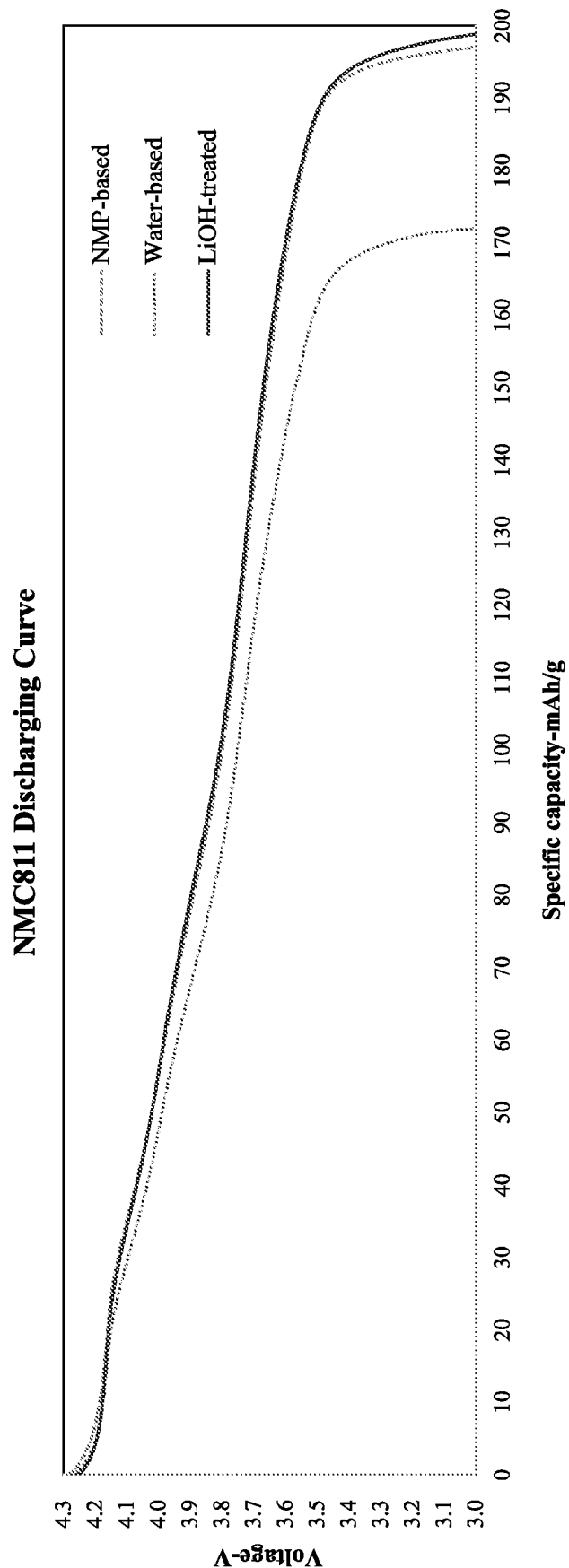
FIG. 4 shows three specific capacity-voltage curves of the first discharge cycle of NMC811.

FIG. 4 shows the discharge curves of three batteries comprising a cathode prepared respectively using an NMP-based slurry, an untreated aqueous slurry and an LiOH-treated aqueous slurry in accordance with the present invention. As illustrated in the graph, the battery with the LiOH-treated aqueous slurry of the present invention exhibits better discharging performance than the battery with the conventional untreated aqueous slurry. This result provides further evidence that the LiOH-treated slurry preparation method of the present invention significantly improves the electrochemical performance of the battery. Furthermore, it is evident that the method disclosed in this invention is advantageous over the conventional water-based method.

When compared to the battery with the NMP-based slurry, the battery with the LiOH-treated aqueous slurry of the present invention exhibits a similar discharge performance, as shown in FIG. 4. However, by using aqueous solvents and water-soluble materials, the method of the present invention reduces the environmental impact of the manufacturing process, as well as lowers production cost as water-soluble materials are generally less expensive and require fewer specialized equipment to handle. Therefore, the present invention can produce lithium-ion batteries more cheaply and in a more environmentally-friendly way without sacrificing battery performance.

Figure 5:
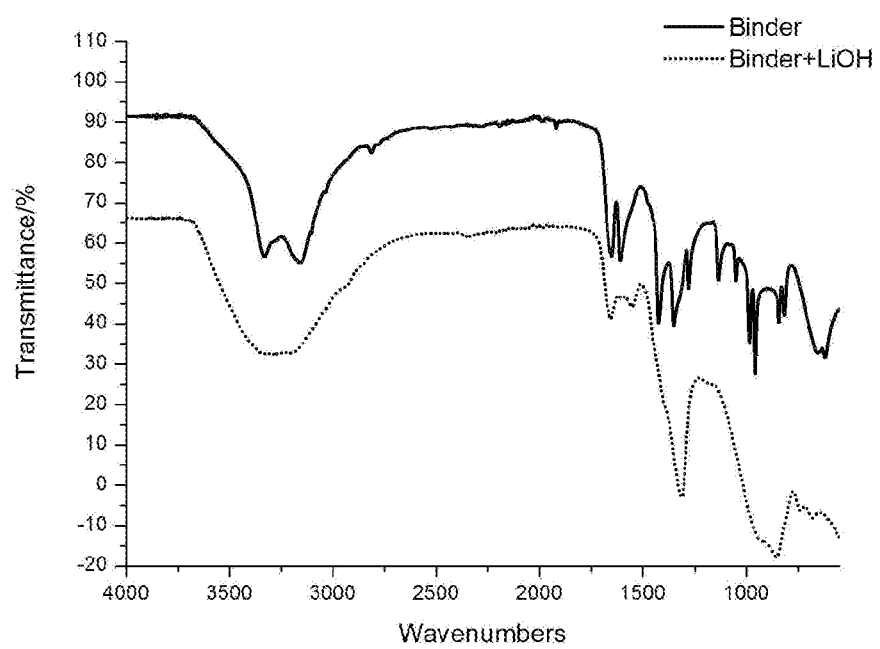
FIG. 5 shows infrared spectroscopy data of polyacrylamide after being mixed with LiOH.
Figure 6:
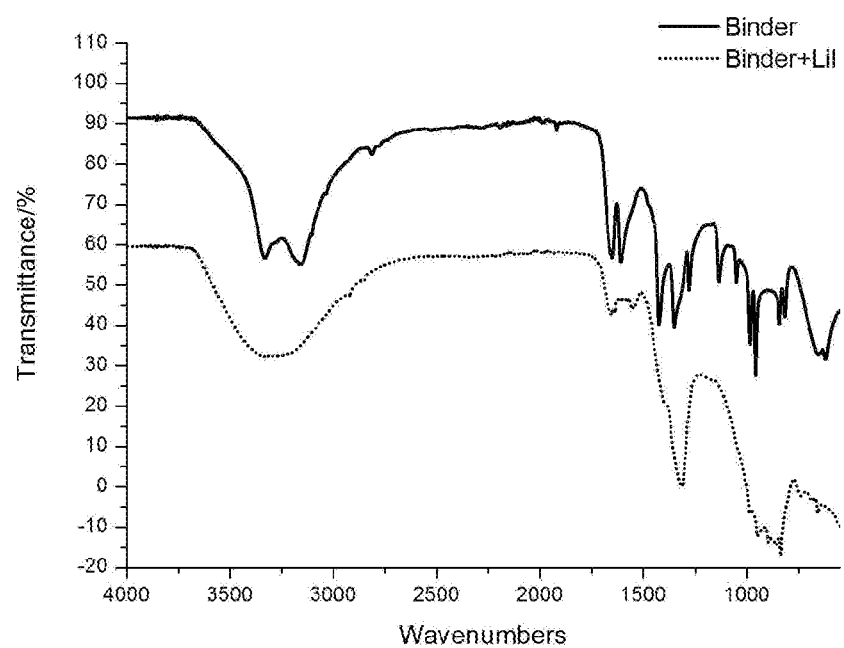
FIG. 6 shows infrared spectroscopy data of polyacrylamide after being mixed with LiI.

Analysis of the cathode slurry and its components have revealed useful physical and chemical characteristics that are acquired from the present method. FIGS. 5 and 6 present infrared spectroscopy data of polyacrylamide (PAM) exposed to lithium hydroxide and lithium iodide respectively. The solid lines show the transmittance spectrum of untreated PAM, which was simply mixed with NMC811 and water for 3 hours. The dashed lines show the transmittance spectrum of PAM that was mixed with the lithium salt for 30 minutes and further mixed with NMC811 for 3 hours. It can be seen that, compared to the spectrum of the untreated PAM, the intensity of many peaks has changed after exposure to the lithium salt. This reveals that PAM undergoes noticeable chemical changes after being exposed to the lithium salt, as done in step 2) of the present method.

Table 3 below shows ICP mass spectroscopy data of diluted solutions of NMC811 with LiOH added at various concentrations. The data demonstrates that less lithium from the cathode active material is dissolved in the solution, thus showing that the lithium salts inhibit loss of lithium from the cathode active material. It can be seen that the concentration of the lithium salt added is positively proportional to the inhibition of lithium loss of the cathode active material.

In some embodiments, the lithium loss of the cathode active material is inhibited by a percentage between 1 percent and 50 percent, relative to the lithium loss of the cathode material in pure water. In certain embodiments, the lithium loss of the cathode active material is inhibited by a percentage between 1 percent and 20 percent, relative to the lithium loss of the cathode material in pure water. In certain embodiments, the lithium loss of the cathode active material is inhibited by a percentage between 1 percent and 30 percent, between 1.5 percent and 20 percent, between 2 percent and 20 percent, between 2.5 percent and 20 percent, between 3 percent and 20 percent, between 4 percent and 20 percent, between 5 percent and 20 percent, between 10 percent and 20 percent, between 1.5 percent and 18 percent, between 2 percent and 18 percent, between 2.5 percent and 18 percent, between 3 percent and 18 percent, between 4 percent and 18 percent, between 5 percent and 18 percent, between 8 percent and 18 percent, between 1.5 percent and 15 percent, between 2 percent and 15 percent, between 2.5 percent and 15 percent, between 3 percent and 15 percent, between 4 percent and 15 percent, between 5 percent and 15 percent, between 10 percent and 15 percent, between 1.5 percent and 14 percent, between 2 percent and 14 percent, between 2.5 percent and 14 percent, between 3 percent and 14 percent, between 4 percent and 14 percent, between 5 percent and 14 percent, between 1 percent and 13 percent, between 1.5 percent and 13 percent, between 2 percent and 13 percent, between 2.5 percent and 13 percent, between 3 percent and 13 percent, between 4 percent and 13 percent, between 5 percent and 13 percent, between 1 percent and 12 percent, between 1.5 percent and 12 percent, between 2 percent and 12 percent, between 2.5 percent and 12 percent, between 3 percent and 12 percent, between 4 percent and 12 percent, or between 5 percent and 12 percent, relative to the lithium loss of the cathode active material in pure water. In some embodiments, the lithium loss of the cathode active material is inhibited by a percentage of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15 percent or above, relative to the lithium loss of the cathode active material in pure water. In some embodiments, the lithium loss of the cathode active material is inhibited by a percentage of 20, 19, 18, 17, 16, 15, 14.5, 14, 13.5, 13, 12.5, 12, 11.5, 11, 10.5, 10, 9.5, 9, 8.5, 8, 7.5, 7, 6.5, 6, 5.5, 5, 4.5, 4, 3.5, 3, 2.5, 2, 1.5, 1 percent or below, relative to the lithium loss of the cathode active material in pure water.

Also provided herein is an electrode assembly comprising a cathode prepared by the method described below. The electrode assembly comprises at least one cathode, at least one anode and at least one separator placed in between the cathode and anode.

In certain embodiments, the electrode assembly is dried after being assembled to reduce its water content. In other embodiments, at least one of the components of the electrode assembly is dried before the electrode assembly is assembled. In some embodiments, at least one of the components is pre-dried before assembly of the electrode assembly. In certain embodiments, the separator is pre-dried before being assembled to the electrode assembly.

It is not necessary to dry the separator to a very low water content. The remaining water content of the pre-dried separator can be further reduced by the subsequent drying step. In some embodiments, the water content in the pre-dried separator is from about 50 ppm to about 800 ppm, from about 50 ppm to about 700 ppm, from about 50 ppm to about 600 ppm, from about 50 ppm to about 500 ppm, from about 50 ppm to about 400 ppm, from about 50 ppm to about 300 ppm, from about 50 ppm to about 200 ppm, from about 50 ppm to about 100 ppm, from about 100 ppm to about 500 ppm, from about 100 ppm to about 400 ppm, from about 100 ppm to about 300 ppm, from about 100 ppm to about 200 ppm, from about 200 ppm to about 500 ppm, from about 200 ppm to about 400 ppm, from about 300 ppm to about 800 ppm, from about 300 ppm to about 600 ppm, from about 300 ppm to about 500 ppm, from about 300 ppm to about 400 ppm, from about 400 ppm to about 800 ppm, or from about 400 ppm to about 500 ppm by weight, based on the total weight of the pre-dried separator. In some embodiments, the water content in the pre-dried separator is less than 500 ppm, less than 400 ppm, less than 300 ppm, less than 200 ppm, less than 100 ppm, or less than 50 ppm by weight, based on the total weight of the pre-dried separator.

In certain embodiments, the dried electrode assembly may have a water content from about 20 ppm to about 350 ppm, from about 20 ppm to about 300 ppm, from about 20 ppm to about 250 ppm, from about 20 ppm to about 200 ppm, from about 20 ppm to about 100 ppm, from about 20 ppm to about 50 ppm, from about 50 ppm to about 350 ppm, from about 50 ppm to about 250 ppm, from about 50 ppm to about 150 ppm, from about 100 ppm to about 350 ppm, from about 100 ppm to about 300 ppm, from about 100 ppm to about 250 ppm, from about 100 ppm to about 200 ppm, from about 100 ppm to about 150 ppm, from about 150 ppm to about 350 ppm, from about 150 ppm to about 300 ppm, from about 150 ppm to about 250 ppm, from about 150 ppm to about 200 ppm, from about 200 ppm to about 350 ppm, from about 250 ppm to about 350 ppm, or from about 300 ppm to about 350 ppm by weight, based on the total weight of the dried electrode assembly.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH value of the slurry was measured by an electrode-type pH meter (ION 2700, Eutech Instruments). The viscosity of slurry was measured using a rotational viscosity meter (NDJ-5S, Shanghai JT Electronic Technology Co. Ltd., China).

The peeling strengths of the dried electrode layers were measured by a tensile testing machine (DZ-106A, obtained from Dongguan Zonhow Test Equipment Co. Ltd., China). This test measures the average force required to peel an electrode layer from the current collector at 1800 angle in Newtons per 18 mm width of the test sample. A strip of adhesion tape (3M; US; model no. 810) with a width of 18 mm was attached onto the surface of the cathode electrode layer. The cathode strip was clipped onto the testing machine and the tape was folded back on itself at 180 degrees, and placed in a moveable jaw and pulled at room temperature and a peel rate of 200 mm per minute. The maximum stripping force measured was taken as the peeling strength. Measurements were repeated three times to find the average value.

The water content in the electrode assembly was measured by Karl-Fischer titration. The electrode assembly was cut into small pieces of 1 cm×1 cm in a glove box filled with argon gas. The cut electrode assembly having a size of 1 cm×1 cm was weighed in a sample vial. The weighed electrode assembly was then added into a titration vessel for Karl Fischer titration using a Karl Fischer coulometry moisture analyzer (831 KF Coulometer, Metrohm, Switzerland). Measurements were repeated three times to find the average value.

The water content in the separator was measured by Karl-Fischer titration. The electrode assembly was cut into small pieces of 1 cm×1 cm in a glove box filled with argon gas. The electrode assembly was separated into the anode, cathode and separator layers. The water contents of the separated separator layers were analyzed by Karl Fischer titration as described above. Measurements were repeated three times to find the average value.

Example 1

A) Preparation of Positive Electrode

A first suspension was prepared by dispersing 0.9 g of conductive agent (SuperP; obtained from Timcal Ltd, Bodio, Switzerland) and 6 g of poly(acrylamide) (PAM) (15% solid content) in 7.4 g of deionized water while stirring with an overhead stirrer (R20, IKA). After the addition, the first suspension was further stirred for about 30 minutes at 25° C. at a speed of 1,200 rpm.

0.02 g of LiOH was dissolved with 100 g of deionized water to produce a lithium aqueous solution at 25° C. with a LiOH concentration of 0.01 M. After the addition, the aqueous solution was further stirred for about 5 minutes at 25° C. Thereafter, a second suspension was prepared by adding 7.5 g of the aqueous solution into the first suspension. After the addition, the second suspension was further stirred for about 30 minutes at 25° C.

Thereafter, a third suspension was prepared by adding 28.2 g of NMC532 (obtained from Shandong Tianjiao New Energy Co., Ltd, China) in the second suspension at 25° C. while stirring with an overhead stirrer. Then, the third suspension was degassed under a pressure of about 10 kPa for 1 hour. Then, the third suspension was further stirred for about 60 minutes at 25° C. at a speed of 1,200 rpm to form a homogenized slurry.

The homogenized slurry was coated onto one side of an aluminum foil having a thickness of 14 μm as a current collector using a doctor blade coater with a gap width of 60 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

B) Preparation of Negative Electrode

A negative electrode slurry was prepared by mixing 90 wt. % of hard carbon (BTR New Energy Materials Inc., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent in deionized water. The solid content of the anode slurry was 50 wt. %. The slurry was coated onto one side of a copper foil having a thickness of 8 μm using a doctor blade with a gap width of about 55 μm. The coated film on the copper foil was dried at about 50° C. for 2.4 minutes by a hot air dryer to obtain a negative electrode. The electrode was then pressed to decrease the thickness of the coating to 30 μm and the surface density was 10 mg/cm$^2$.

C) Assembling of Coin Cell

CR2032 coin-type Li cells were assembled in an argon-filled glove box. The coated cathode and anode sheets were cut into disc-form positive and negative electrodes, which were then assembled into an electrode assembly by stacking the cathode and anode electrode plates alternatively and then packaged in a case made of stainless steel of the CR2032 type. The cathode and anode electrode plates were kept apart by separators. The separator was a ceramic coated microporous membrane made of nonwoven fabric (MPM, Japan), which had a thickness of about 25 μm. The electrode assembly was then dried in a box-type resistance oven under vacuum (DZF-6020, obtained from Shenzhen Kejing Star Technology Co. Ltd., China) at 105° C. for about 16 hours. The water content of the separator and electrode assembly after drying was 200 ppm and 300 ppm respectively.

An electrolyte was then injected into the case holding the packed electrodes under a high-purity argon atmosphere with a moisture and oxygen content of less than 3 ppm respectively. The electrolyte was a solution of LiPF$_6$ (1 M) in a mixture of ethylene carbonate (EC), ethyl methyl carbonate (EMC) and dimethyl carbonate (DMC) at a volume ratio of 1:1:1. After electrolyte filling, the coin cell was vacuum sealed and then mechanically pressed using a punch tooling with a standard circular shape.

D) Electrochemical Measurements

The coin cells were analyzed in a constant current mode using a multi-channel battery tester (BTS-4008-5V10 mA, obtained from Neware Electronics Co. Ltd, China). After 1 cycle at C/20 was completed, they were charged and discharged at a rate of C/2. The charging/discharging cycling tests of the cells were performed between 3.0 and 4.3 V at a current density of C/2 at 25° C. to obtain the discharge capacity. The electrochemical performance of the coin cell of Example 1 was measured and is shown in Table 1 below.

Example 2

A positive electrode was prepared in the same manner as in Example 1, except that the aqueous solution was formed by dissolving 0.12 g of LiOH with 100 g of deionized water, so that the aqueous solution had a LiOH concentration of 0.05 M and a second suspension was prepared by adding 7.5 g of the aqueous solution into the first suspension.

Example 3

A positive electrode was prepared in the same manner as in Example 1, except that the aqueous solution was formed by dissolving 1.20 g of LiOH with 100 g of deionized water, so that an aqueous solution with LiOH concentration of 0.5 M and a second suspension was prepared by adding 7.5 g of the aqueous solution into the first suspension.

Example 4

A positive electrode was prepared in the same manner as in Example 2, except that the second suspension was further stirred for about 5 minutes at 25° C.

Example 5

A positive electrode was prepared in the same manner as in Example 2, except that the second suspension was further stirred for about 60 minutes at 25° C.

Example 6

A positive electrode was prepared in the same manner as in Example 2, except that 0.67 g of LiI was dissolved with 100 g of deionized water to produce an aqueous solution at 25° C. with a LiI concentration of 0.05M.

Example 7

A positive electrode was prepared in the same manner as in Example 2, except that 0.33 g of LiAc was dissolved with 100 g of deionized water to produce an aqueous solution at 25° C. with a LiAc concentration of 0.05M.

Comparative Example 1

A positive electrode slurry was prepared by dispersing 28.2 g of NMC532 (obtained from Shandong Tianjiao New Energy Co., Ltd, China), 0.9 g of conductive agent (SuperP; obtained from Timcal Ltd, Bodio, Switzerland) and 6 g of PAM binder (15% solid content) in 14.9 g of deionized water while stirring with an overhead stirrer. The slurry was degassed under a pressure of about 10 kPa for 1 hour. Then, the slurry was further stirred for about 60 minutes at 25° C. at a speed of 1,200 rpm.

The homogenized slurry was coated onto one side of an aluminum foil having a thickness of 14 μm as a current collector using a doctor blade coater with a gap width of 60 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

Comparative Example 2

A positive electrode slurry was prepared by dispersing 28.2 g of NMC532 (obtained from Shandong Tianjiao New Energy Co., Ltd, China), 0.9 g of conductive agent (SuperP; obtained from Timcal Ltd, Bodio, Switzerland) and 9 g of polyvinylidene fluoride binder (PVDF; 10 wt. % solution in NMP; Solef© 5130, obtained from Solvay S. A., Belgium) in 11.9 g of N-methyl-2-pyrrolidone (NMP; ≥99%, Sigma-Aldrich, USA) while stirring with an overhead stirrer. The slurry was degassed under a pressure of about 10 kPa for 1 hour. Then, the slurry was further stirred for about 60 minutes at 25° C. at a speed of 1,200 rpm.

The homogenized slurry was coated onto one side of an aluminum foil having a thickness of 14 μm as a current collector using a doctor blade coater with a gap width of 60 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

Preparation of Negative Electrode of Examples 2-7 and Comparative Examples 1-2

The negative electrodes of Examples 2-7 and Comparative Examples 1-2 were prepared in the same manner as in Example 1.

Assembling of Coin Cells of Examples 2-7 and Comparative Examples 1-2

The coin cells of Examples 2-7 and Comparative Examples 1-2 were assembled in the same manner as in Example 1.

Electrochemical Measurements of Examples 2-7 and Comparative Examples 1-2

The electrochemical performance of the coin cells of Examples 2-7 and Comparative Examples 1-2 was measured in the same manner as in Example 1 and the test results are shown in Table 1 below.

Example 8

A positive electrode was prepared in the same manner as in Example 1, except that the 28.2 g of NMC532 was replaced with NMC622 (obtained from Shandong Tianjiao New Energy Co., Ltd, China) of the same weight.

Example 9

A positive electrode was prepared in the same manner as in Example 8, except that the aqueous solution was formed by dissolving 0.12 g of LiOH with 100 g of deionized water, so that the aqueous solution had a LiOH concentration of 0.05 M and a second suspension was prepared by adding 7.5 g of the aqueous solution into the first suspension.

Example 10

A positive electrode was prepared in the same manner as in Example 8, except that the aqueous solution was formed by dissolving 1.20 g of LiOH with 100 g of deionized water, so that the aqueous solution had a LiOH concentration of 0.5 M and a second suspension was prepared by adding 7.5 g of the aqueous solution into the first suspension.

Example 11

A positive electrode was prepared in the same manner as in Example 9, except that the second suspension was further stirred for about 5 minutes at 25° C.

Example 12

A positive electrode was prepared in the same manner as in Example 9, except that the second suspension was further stirred for about 60 minutes at 25° C.

Example 13

A positive electrode was prepared in the same manner as in Example 9, except that 0.67 g of LiI was dissolved with 100 g of deionized water to produce an aqueous solution at 25° C. with a LiI concentration of 0.05M.

Example 14

A positive electrode was prepared in the same manner as in Example 9, except that 0.33 g of LiAc was dissolved with 100 g of deionized water to produce an aqueous solution at 25° C. with a LiAc concentration of 0.05M.

Comparative Example 3

A positive electrode was prepared in the same manner as in Comparative Example 1, except that the 28.2 g of NMC532 was replaced with NMC622 of the same weight.

Comparative Example 4

A positive electrode was prepared in the same manner as in Comparative Example 2, except that the 28.2 g of NMC532 was replaced with NMC622 of the same weight.

Preparation of Negative Electrode of Examples 8-14 and Comparative Examples 3-4

The negative electrodes of Examples 8-14 and Comparative Examples 3-4 were prepared in the same manner as in Example 1.

Assembling of Coin Cells of Examples 8-14 and Comparative Examples 3-4

The coin cells of Examples 8-14 and Comparative Examples 3-4 were assembled in the same manner as in Example 1.

Electrochemical Measurements of Examples 8-14 and Comparative Examples 3-4

The electrochemical performance of the coin cells of Examples 8-14 and Comparative Examples 3-4 was measured in the same manner as in Example 1 and the test results are shown in Table 1 below.

Example 15

A) Preparation of Positive Electrode

A first suspension was prepared by dispersing 0.9 g of conductive agent (SuperP; obtained from Timcal Ltd, Bodio, Switzerland) and 6 g of PAM binder in 4.9 g of deionized water while stirring with an overhead stirrer (R20, IKA). After the addition, the second suspension was further stirred for about 30 minutes at 25° C. at a speed of 1,200 rpm.

0.02 g of LiOH was dissolved with 100 g of deionized water to produce a lithium aqueous solution at 25° C. with a LiOH concentration of 0.01 M. After the addition, the aqueous solution was further stirred for about 5 minutes at 25° C. Thereafter, a second suspension was prepared by adding 10 g of the aqueous solution into the first suspension. After the addition, the second suspension was further stirred for about 30 minutes at 25° C.

Thereafter, a third suspension was prepared by adding 28.2 g of NMC811 (obtained from Shandong Tianjiao New Energy Co., Ltd, China) in the second suspension at 25° C. while stirring with an overhead stirrer. Then, the third suspension was degassed under a pressure of about 10 kPa for 1 hour. Then, the third suspension was further stirred for about 60 minutes at 25° C. at a speed of 1,200 rpm to form a homogenized slurry.

The homogenized slurry was coated onto one side of a carbon-coated aluminum foil having a thickness of 14 μm as a current collector using a doctor blade coater with a gap width of 60 μm. The thickness of the carbon coating was 1 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

Example 16

A positive electrode was prepared in the same manner as in Example 15, except that the aqueous solution was formed by dissolving 0.12 g of LiOH with 100 g of deionized water, so that an aqueous solution with LiOH concentration of 0.05 M and a second suspension was prepared by adding 10 g of the aqueous solution into the first suspension.

Example 17

A positive electrode was prepared in the same manner as in Example 15, except that the aqueous solution was formed by dissolving 1.20 g of LiOH with 100 g of deionized water, so that an aqueous solution with LiOH concentration of 0.5 M and a second suspension was prepared by adding 10 g of the aqueous solution into the first suspension.

Example 18

A positive electrode was prepared in the same manner as in Example 16, except that the second suspension was further stirred for about 5 minutes at 25° C.

Example 19

A positive electrode was prepared in the same manner as in Example 16, except that the second suspension was further stirred for about 60 minutes at 25° C.

Example 20

A positive electrode was prepared in the same manner as in Example 16, except that 0.67 g of LiI was dissolved with 100 g of deionized water to produce an aqueous solution at 25° C. with a LiI concentration of 0.05M.

Example 21

A positive electrode was prepared in the same manner as in Example 16, except that 0.33 g of LiAc was dissolved with 100 g of deionized water to produce an aqueous solution at 25° C. with a LiAc concentration of 0.05M.

Example 22

A positive electrode was prepared in the same manner as in Example 16, except that 0.34 g of $LiNO_3$ was dissolved with 100 g of deionized water to produce an aqueous solution at 25° C. with a $LiNO_3$ concentration of 0.05M.

Comparative Example 5

A positive electrode slurry was prepared by dispersing 28.2 g of NMC811 (obtained from Shandong Tianjiao New Energy Co., Ltd, China), 0.9 g of conductive agent (SuperP; obtained from Timcal Ltd, Bodio, Switzerland) and 10 g of PAM binder (15% solid content) in 14.9 g of deionized water while stirring with an overhead stirrer. The slurry was degassed under a pressure of about 10 kPa for 1 hour. Then, the slurry was further stirred for about 60 minutes at 25° C. at a speed of 1,200 rpm.

The homogenized slurry was coated onto one side of a carbon-coated aluminum foil having a thickness of 14 μm as a current collector using a doctor blade coater with a gap width of 60 μm. The thickness of the carbon coating was 1 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

Comparative Example 6

A positive electrode slurry was prepared by dispersing 28.2 g of NMC811 (obtained from Shandong Tianjiao New Energy Co., Ltd, China), 0.9 g of conductive agent (SuperP; obtained from Timcal Ltd, Bodio, Switzerland) and 9 g of PVDF (Solef© 5130, obtained from Solvay S. A., Belgium) in 11.9 g of NMP (≥99%, Sigma-Aldrich, USA) while stirring with an overhead stirrer. The slurry was degassed under a pressure of about 10 kPa for 1 hour. Then, the slurry was further stirred for about 60 minutes at 25° C. at a speed of 1,200 rpm.

The homogenized slurry was coated onto one side of a carbon-coated aluminum foil having a thickness of 14 μm as a current collector using a doctor blade coater with a gap width of 60 μm. The thickness of the carbon coating was 1 μm. The coated slurry film on the aluminum foil was dried to form a cathode electrode layer by an electrically heated conveyor oven (TH-1A, obtained from Nanjing Tonghao Drying Equipment Co. Ltd., China) at 50° C. at a conveyor speed of about 5 meters/minute. The drying time was about 6 minutes. The electrode was then pressed to decrease the thickness of the cathode electrode layer to 35 μm.

Preparation of Negative Electrode of Examples 15-22 and Comparative Examples 5-6

The negative electrodes of Examples 15-22 and Comparative Examples 5-6 were prepared in the same manner as in Example 1.

Assembling of Coin Cell of Examples 15-22 and Comparative Examples 5-6

The coin cells of Examples 15-22 and Comparative Examples 5-6 were assembled in the same manner as in Example 1.

Electrochemical Measurements of Examples 15-22 and Comparative Examples 5-6

The electrochemical performance of the coin cells of Examples 15-22 and Comparative Examples 5-6 was measured in the same manner as in Example 1 and the test results are shown in Table 2 below.

Example 23

A positive electrode was prepared in the same manner as in Example 15, except that the 28.2 g of NMC811 was replaced with NCA of the same weight.

Example 24

A positive electrode was prepared in the same manner as in Example 23, except that the aqueous solution was formed by dissolving 0.12 g of LiOH with 100 g of deionized water, so that a third suspension with LiOH concentration of 0.05 M and a second suspension was prepared by adding 10 g of the aqueous solution into the first suspension.

Example 25

A positive electrode was prepared in the same manner as in Example 23, except that the aqueous solution was formed by dissolving 1.20 g of LiOH with 100 g of deionized water, so that a third suspension with LiOH concentration of 0.5 M and a second suspension was prepared by adding 10 g of the aqueous solution into the first suspension.

Example 26

A positive electrode was prepared in the same manner as in Example 24, except that the second suspension was further stirred for about 5 minutes at 25° C.

Example 27

A positive electrode was prepared in the same manner as in Example 24, except that the second suspension was further stirred for about 60 minutes at 25° C.

Example 28

A positive electrode was prepared in the same manner as in Example 24, except that 0.67 g of LiI was dissolved with 100 g of deionized water to produce an aqueous solution at 25° C. with a LiI concentration of 0.05 M.

Example 29

A positive electrode was prepared in the same manner as in Example 24, except that 0.33 g of LiAc was dissolved with 100 g of deionized water to produce an aqueous solution at 25° C. with a LiAc concentration of 0.05 M.

Example 30

A positive electrode was prepared in the same manner as in Example 2, except a copolymer of acrylamide and acrylonitrile was used as the binder (15% solid content).

Example 31

A positive electrode was prepared in the same manner as in Example 2, except a copolymer of acrylamide and methacrylic acid was used (15% solid content) as the binder.

Example 32

A positive electrode was prepared in the same manner as in Example 2, except a core-shell cathode active material (C-S) comprising NMC532 as the core and $Li_{0.95}Ni_{0.53}Mn_{0.29}Co_{0.15}Al_{0.03}O_2$ as the shell was used. The cathode active material has a particle size D50 of about 35 μm. The thickness of the shell was about 3 μm.

Comparative Example 7

A positive electrode was prepared in the same manner as in Comparative Example 5, except that the 28.2 g of NMC811 was replaced with NCA of the same weight.

Comparative Example 8

A positive electrode was prepared in the same manner as in Comparative Example 6, except that the 28.2 g of NMC811 was replaced with NCA of the same weight.

Preparation of Negative Electrode of Examples 23-32 and Comparative Examples 7-8

The negative electrodes of Examples 23-32 and Comparative Examples 7-8 were prepared in the same manner as in Example 1.

Assembling of Coin Cells of Examples 23-32 and Comparative Examples 7-8

The coin cells of Examples 23-32 and Comparative Examples 7-8 were assembled in the same manner as in Example 1.

Electrochemical Measurements of Examples 23-32 and Comparative Examples 7-8

The electrochemical performance of the coin cells of Examples 23-32 and Comparative Examples 7-8 was measured in the same manner as in Example 1 and the test results are shown in Table 2 below.

TABLE 1

|  | Cathode active material | 2nd suspension | | | | pH of cathode slurry | | 0.5 C Initial discharging capacity (mAh/g) | Capacity retention after 100 cycles (%) |
|---|---|---|---|---|---|---|---|---|---|
|  |  | Li salt | Li+ conc. (M) | Stirring time (mins) | Solvent | Beginning | End |  |  |
| Example 1 | NMC532 | LiOH | 0.003 | 30 | Water | 11.22 | 11.19 | 143 | 81.2 |
| Example 2 | NMC532 | LiOH | 0.017 | 30 | Water | 12.25 | 12.19 | 147 | 82.5 |
| Example 3 | NMC532 | LiOH | 0.172 | 30 | Water | 12.94 | 12.86 | 144 | 80.5 |
| Example 4 | NMC532 | LiOH | 0.017 | 5 | Water | 12.20 | 12.17 | 140 | 78.5 |
| Example 5 | NMC532 | LiOH | 0.017 | 60 | Water | 12.25 | 12.18 | 141 | 77.3 |
| Example 6 | NMC532 | LiI | 0.017 | 30 | Water | 11.15 | 11.24 | 143 | 79.9 |
| Example 7 | NMC532 | LiAc | 0.017 | 30 | Water | 11.18 | 11.25 | 144 | 79.2 |
| Example 8 | NMC622 | LiOH | 0.003 | 30 | Water | 11.89 | 11.91 | 153 | 80.5 |
| Example 9 | NMC622 | LiOH | 0.017 | 30 | Water | 12.43 | 12.31 | 155 | 82.4 |
| Example 10 | NMC622 | LiOH | 0.172 | 30 | Water | 12.99 | 12.94 | 153 | 80.9 |
| Example 11 | NMC622 | LiOH | 0.017 | 5 | Water | 12.40 | 12.31 | 150 | 78.5 |
| Example 12 | NMC622 | LiOH | 0.017 | 60 | Water | 12.43 | 12.28 | 148 | 79.2 |
| Example 13 | NMC622 | LiI | 0.017 | 30 | Water | 11.89 | 12.20 | 156 | 79.1 |
| Example 14 | NMC622 | LiAc | 0.017 | 30 | Water | 11.92 | 12.13 | 153 | 79.4 |
| Comparative Example 1 | NMC532 | — | — | — | Water | 11.23 | 11.61 | 143 | 70.2 |
| Comparative Example 2 | NMC532 | — | — | — | NMP | — | — | 149 | 80.0 |
| Comparative Example 3 | NMC622 | — | — | — | Water | 11.91 | 12.41 | 151 | 70.8 |
| Comparative Example 4 | NMC622 | — | — | — | NMP | — | — | 159 | 78.9 |

TABLE 2

|  | Cathode active material | 2nd suspension | | | | pH of cathode slurry | | 0.5 C Initial discharging capacity (mAh/g) | Capacity retention after 100 cycles (%) |
|---|---|---|---|---|---|---|---|---|---|
|  |  | Li salt | Li+ conc. (M) | Stirring time (mins) | Solvent | Beginning | End |  |  |
| Example 15 | NMC811 | LiOH | 0.005 | 30 | Water | 12.75 | 12.63 | 178 | 79.6 |
| Example 16 | NMC811 | LiOH | 0.023 | 30 | Water | 12.74 | 12.66 | 180 | 81.2 |
| Example 17 | NMC811 | LiOH | 0.229 | 30 | Water | 12.93 | 12.86 | 173 | 79.7 |
| Example 18 | NMC811 | LiOH | 0.023 | 5 | Water | 12.74 | 12.66 | 174 | 77.9 |
| Example 19 | NMC811 | LiOH | 0.023 | 60 | Water | 12.74 | 12.66 | 176 | 79.9 |
| Example 20 | NMC811 | LiI | 0.023 | 30 | Water | 12.39 | 12.30 | 182 | 76.5 |
| Example 21 | NMC811 | LiAc | 0.023 | 30 | Water | 12.68 | 12.59 | 181 | 78.6 |
| Example 22 | NMC811 | $LiNO_3$ | 0.023 | 30 | Water | 12.28 | 12.48 | 178 | 73.3 |
| Example 23 | NCA | LiOH | 0.005 | 30 | Water | 12.70 | 12.53 | 173 | 78.3 |
| Example 24 | NCA | LiOH | 0.023 | 30 | Water | 12.66 | 12.52 | 177 | 80.6 |
| Example 25 | NCA | LiOH | 0.229 | 30 | Water | 12.67 | 12.44 | 169 | 77.4 |
| Example 26 | NCA | LiOH | 0.023 | 5 | Water | 12.66 | 12.52 | 168 | 76.3 |
| Example 27 | NCA | LiOH | 0.023 | 60 | Water | 12.66 | 12.52 | 170 | 77.9 |
| Example 28 | NCA | LiI | 0.023 | 30 | Water | 12.51 | 12.75 | 175 | 75.7 |
| Example 29 | NCA | LiAc | 0.023 | 30 | Water | 12.35 | 12.62 | 177 | 73.3 |
| Example 30 | NMC532 | LiOH | 0.017 | 30 | Water | 12.26 | 12.20 | 148 | 83.0 |
| Example 31 | NMC532 | LiOH | 0.017 | 30 | Water | 12.23 | 12.16 | 149 | 82.9 |
| Example 32 | C-S | LiOH | 0.017 | 30 | Water | 12.26 | 12.25 | 145 | 82.5 |
| Comparative Example 5 | NMC811 | — | — | — | Water | 12.36 | 12.85 | 177 | 64.3 |
| Comparative Example 6 | NMC811 | — | — | — | NMP | — | — | 185 | 75.1 |
| Comparative Example 7 | NCA | — | — | — | Water | 12.47 | 12.87 | 178 | 65.6 |
| Comparative Example 8 | NCA | — | — | — | NMP | — | — | 186 | 76.3 |

TABLE 3

| Li salt added | Conc. of Li salt solution (M) | Total conc. of Li in undiluted slurry (M) | Undiluted amount of Li dissolved from cathode material (ppm)* | % of Li dissolved from cathode material relative to pure water treatment |
|---|---|---|---|---|
| LiOH | 0 | 0.396 | 35460.69 | 100 |
|  | 0.057 | 0.412 | 34120.27 | 96.2 |
|  | 0.114 | 0.418 | 32608.67 | 92.0 |
|  | 0.171 | 0.437 | 32433.11 | 91.5 |
|  | 0.228 | 0.449 | 31817.62 | 89.7 |

*Based on the total weight of the lithium present in the cathode material (approx. 7 wt % of cathode material)

What is claimed is:

1. A method of preparing a cathode for a secondary battery, comprising the steps of:
1) dispersing a binder material and a conductive agent in water to form a first suspension;
2) adding an aqueous solution containing at least one lithium compound into the first suspension to form a second suspension;
3) adding a cathode active material into the second suspension to form a third suspension;
4) homogenizing the third suspension by a homogenizer to obtain a homogenized slurry;
5) applying the homogenized slurry on a current collector to form a coated film on the current collector; and
6) drying the coated film on the current collector to form the cathode,
wherein the lithium compound is selected from the group consisting of lithium borate, lithium bromide, lithium chloride, lithium hydrogen carbonate, lithium hydroxide, lithium iodide, lithium nitrate, lithium sulfate, lithium acetate, lithium lactate, lithium citrate, lithium succinate and combinations thereof.

2. The method of claim 1, wherein the cathode active material is selected from the group consisting of $Li_{1+x}Ni_aMn_bCo_cAl_{(1-a-b-c)}O_2$, $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiCoO_2$, $LiNiO_2$, $LiMnO_2$, $LiMn_2O_4$, $Li_2MnO_3$, and combinations thereof; wherein $-0.2 \leq x \leq 0.2$, $0 \leq a < 1$, $0 \leq b < 1$, $0 \leq c < 1$, and $a+b+c \leq 1$.

3. The method of claim 1, wherein the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$.

4. The method of claim 1, wherein the solubility of the lithium compound in water with 20° C. is higher than 1 g/100 ml and wherein the concentration of the lithium ion in the second suspension ranges from about 0.0005 M to about 0.5 M.

5. The method of claim 1, wherein step 2) is mixed for a time period from about 5 minutes to about 60 minutes at a temperature from about 5° C. to about 30° C. and wherein the pH of the second suspension is from about 7 to about 13.

6. The method of claim 1, wherein the conductive agent is selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon and combinations thereof.

7. The method of claim 1, further comprising a step of degassing the third suspension under a vacuum pressure of from about 1 kPa to about 20 kPa for a time period from about 30 minutes to about 4 hours.

8. The method of claim 1, wherein the third suspension is homogenized for a time period from about 30 minutes to about 6 hours at a temperature from about 10° C. to about 30° C.

9. The method of claim 1, wherein the solid content of the homogenized slurry is from about 45% to about 75% by weight, based on the total weight of the homogenized slurry and wherein the homogenized slurry is free of a dispersing agent selected from the group consisting of a cationic surfactant, an anionic surfactant, a nonionic surfactant, an amphoteric surfactant, and a polymeric acid.

10. The method of claim 1, wherein the decrease in pH observed during step 4) is from about 0.1 pH units to about 1.0 pH units and wherein the pH of the homogenized slurry is from about 8 to about 14.

11. The method of claim 1, wherein the coated film on the current collector is dried at a temperature from about 25 to about 75° C. for a time period of about 2 minutes to about 20 minutes.

12. The method of claim 1, wherein the total processing time for steps 3)-6) is less than 5 hours.

* * * * *